United States Patent [19]

Gumacos et al.

[11] Patent Number: 4,583,048

[45] Date of Patent: Apr. 15, 1986

[54] MSK DIGITAL DEMODULATOR FOR BURST COMMUNICATIONS

[75] Inventors: Constantine Gumacos, Broomall, Pa.; Nicola A. Macina, Somerville, N.J.

[73] Assignee: RCA Corporation, Princeton, N.J.

[21] Appl. No.: 705,710

[22] Filed: Feb. 26, 1985

[51] Int. Cl.[4] .......................................... H03D 3/00
[52] U.S. Cl. .................................. 329/122; 329/50; 375/90; 375/96
[58] Field of Search .................. 329/50, 122, 124; 375/47, 90, 96

[56] References Cited

U.S. PATENT DOCUMENTS

| | | | |
|---|---|---|---|
| 3,739,288 | 6/1973 | Coccagna | 329/104 |
| 4,079,329 | 3/1978 | England et al. | 329/50 |
| 4,238,739 | 12/1980 | Mosley et al. | 329/122 X |
| 4,240,111 | 12/1980 | Meise | 358/154 |
| 4,246,654 | 1/1981 | Malm | 375/82 |
| 4,291,409 | 9/1981 | Weinburg et al. | 375/1 |
| 4,504,786 | 3/1985 | Slaughter | 324/78 R |
| 4,527,275 | 7/1985 | Russell | 375/1 |
| 4,538,111 | 8/1985 | Giusto | 329/122 |

OTHER PUBLICATIONS

Title: Minimum Shift Keying: A Spectrally Efficient Modulation; Author: Subbarayan Pasupathy/IEEE Communications Magazine; Date: Jul. 1979, pp. 14–22.
U.S. Patent Application entitled: Digital Modulation System; Inventor: Edward Joachim Nossen; filed: 12/28/84; Ser. No. 687,546.

*Primary Examiner*—Eugene R. LaRoche
*Assistant Examiner*—Robert J. Pascal
*Attorney, Agent, or Firm*—Joseph S. Tripoli; Robert L. Troike; William H. Meise

[57] ABSTRACT

A receiver for burst transmission of MSK-modulated binary signals includes in-phase (I) and quadrature (Q) demodulation under the control of reference sine and cosine signals. Initially, the reference signals are near the nominal carrier frequency of the received signal, but at arbitrary phase, so that noncoherent detection takes place. A control circuit is provided to slew the reference signals to the same phase as the MSK carrier for low-noise coherent detection. Because of the burst nature of the communications, data throughput is significantly reduced if reference phase acquisition time is large. In order to reduce the phase acquisition slew time, each burst of data is preceded by a predetermined preamble. In the receiver, the noncoherently detected preamble is applied to a set of four preamble-matched correlators which respond to the I and Q portions of the preamble, and to the cross-coupled Q and I portions contaminating the I and Q portions respectively. At the moment that the preamble completely fills the correlators, each correlator produces a correlation peak having a magnitude and polarity. The relative magnitudes and polarities of the four correlation outputs at the instant of receipt of the preamble uniquely determines the relative phase difference ($\theta$) between the sine reference signal and the MSK carrier. The phase difference signal $\theta$ slews the reference signal phase to near the desired phase at the beginning of the data portion of the burst transmission. In order to keep the reference signals in-phase with the MSK carrier during the data portion of the transmission, the received data is used as a predetermined signal once the bit decisions have been made. The bit-decided data is applied to set of four correlators the taps of which are adaptively controlled in response to the bit decisions to continuously generate $\theta$ for control of the reference phase.

8 Claims, 13 Drawing Figures

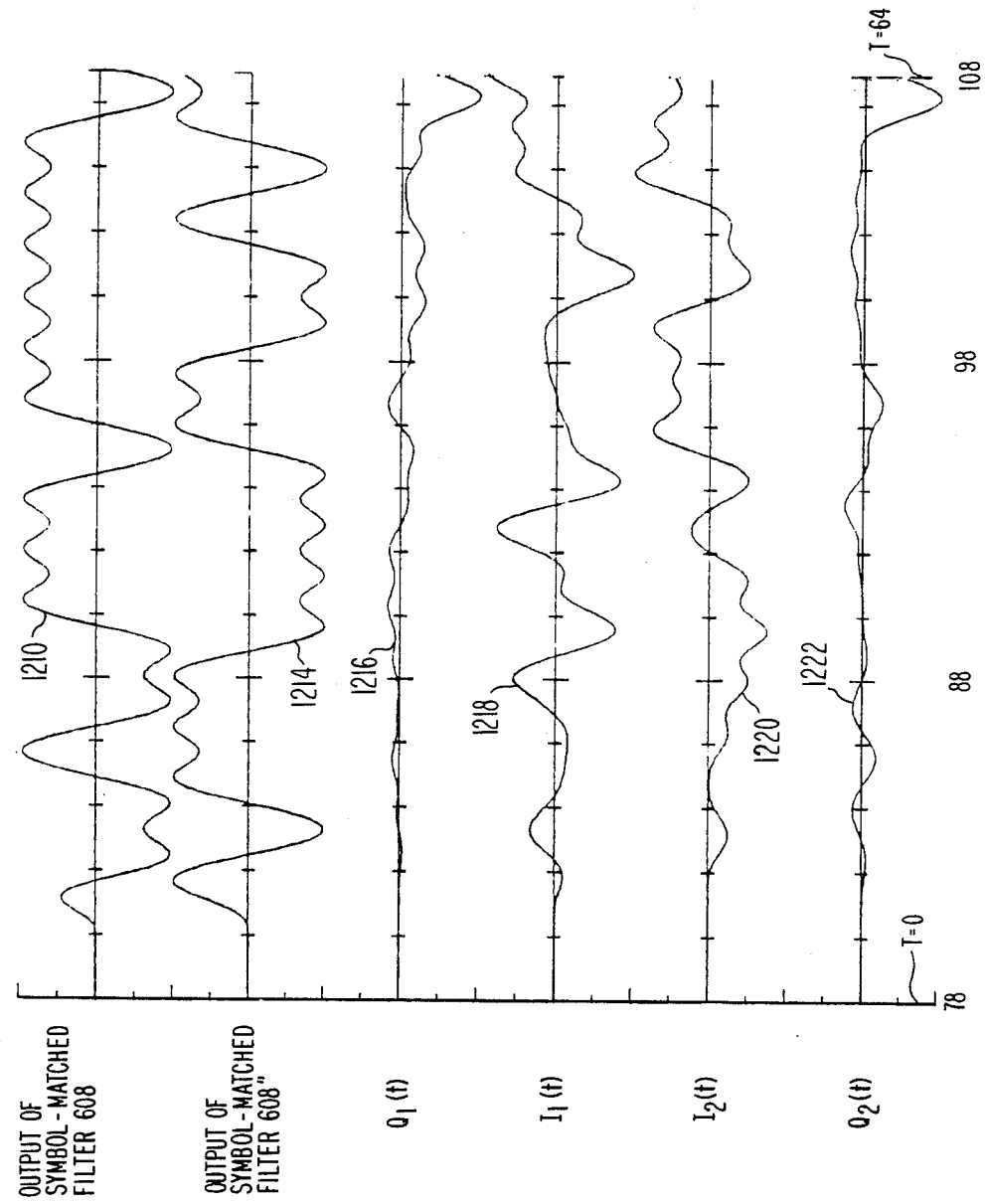

MSK DIGITAL DEMODULATOR FOR BURST COMMUNICATIONS

This invention relates to an arrangement for reducing the lock-up time and improving the precision of lock-up in the generation of a synchronous demodulation signal for burst minimum-shift-keyed communications.

Minimum-shift keying (MSK) is a form of frequency-shift keying with frequency separation equal to one-half the bit rate. It provides spectrally efficient modulation in terms of bits-per-second per Hertz (Hz) of bandwidth. In the case of MSK modulated by a binary (two-level) information signal representing two symbols (Mark and Space), the modulated MSK signal takes on a first frequency during the Mark intervals and a second frequency during the Space intervals, without phase discontinuity at the transition between symbols. The modulated signal may be represented by the mathematical expression $s(t) = \sin((W_o t + \phi(t))$ in which the term $\sin(W_o t)$ represents a carrier at a frequency $f_o$ half-way between the frequencies taken by the carrier at its Mark and Space frequency excursions, and the $\phi(t)$ component represents the modulation information. It should be noted that there is no actual carrier at the half-way frequency, but it is convenient to express the signal in these terms.

It is known to demodulate modulated MSK signals by the concurrent use of I and Q demodulators, each of which includes a multiplier. Sinusoidal and cosinusoidal reference or demodulating signals are applied to the Q and I multipliers, respectively, at a frequency equal to that of the above-mentioned carrier frequency. It is known that asynchronous demodulation can be accomplished with reference signals which are at the same frequency as the MSK carrier, but which are not necessarily in the same phase. This type of asynchronous demodulation results in an increase in noise by comparison with synchronous demodulation, in which the sinusoidal reference signal is in both frequency and phase synchronism with the carrier component $\sin(W_o t)$ of the modulated MSK signal. Increased noise results in increased error rate, and is therefore undesirable. It is therefore very desirable to demodulate using sinusoidal reference signals which are in-phase with the carrier component $\sin(W_o t)$ of the MSK signal. The cosinusoidal reference signal is, of course, in phase quadrature with the sinusoidal reference signal. When the communication exists for a long period of time, it is possible to use a phase-lock loop (PLL) to generate the phased reference signals. To use phase-locked loops, the received signal is applied to a nonlinear (squaring) circuit which generates two frequency-doubled signals in response to the Mark and Space portions of the incoming signal. These are narrow-band filtered to produce two filtered double-frequency signals, and each filtered double-frequency signal is applied to a phase-lock loop to generate continuous carriers at twice the Mark and Space carrier frequencies. These continuous double-frequency signals are frequency-divided in a counter to produce signals at the Mark and Space frequencies. The two frequency-divided signals are added together to produce the cosine component of the reference or demodulating signal, and the two frequency-divided signals are differenced or subtracted from each other to produce the sine component of the reference signal. The sinusoidal and cosinusoidal components of the reference signal are applied to I and Q multipliers, as mentioned above, to which the signal to be demodulated is also applied to generate I and Q baseband components which can then be decoded in known fashion.

As mentioned, when burst communications are to be transmitted, as for example in frequency-hopping applications, the signal to be demodulated exists for a very short period of time. Consequently, there is little time in which the phase-lock loop can slew to the proper phase in order to provide the desired reference signal. During the slew time of the phase-lock loops, synchronous demodulation cannot take place. Consequently, for a given lock-up time of a phase-lock loop, the time available for synchronously demodulating the desired signal is reduced disproportionately as the burst interval of the communication is reduced. It should be understood that as the time of the communication decreases, the burst error rate tends to increase, because the squaring circuit in the presence of noise may produce extraneous signals which tend to increase the error rate. It is very desirable to rapidly produce the reference demodulating signals with the desired phase accuracy, so that synchronous I and Q demodulation may be accomplished in a burst communication system.

SUMMARY OF THE INVENTION

A demodulator for signal transmissions including in-phase and quadrature components of information preceded by a known preamble all MSK-modulated onto a carrier includes a demodulator. The demodulator demodulates the signal transmissions under control of reference sine and cosine signals. Noncoherent detection or demodulation takes place when the reference sine and cosine signals are not in-phase and in phase quadrature, respectively, with the carrier, and coherent demodulation takes place when the reference sine signal is in-phase with the carrier and the reference cosine signal is in phase quadrature with the carrier. The demodulator regenerates the in-phase (I) and quadrature (Q) components of the the information and preamble. When the demodulation is noncoherent, the I component is contaminated by a portion of Q component, and the Q component is contaminated by a portion of I component. At least the preamble portion of the demodulated I and Q signals is applied to a preamble-matched filter arrangement of correlators responsive to the I and Q components, and to the contaminating Q and I components, respectively, for generating four correlation peaks, the relative magnitudes and polarities of which uniquely establish the phase difference between the reference sine signal and the carrier. A control circuit processes the correlation peaks to generate a phase-difference indicative signal and applies it to the demodulator to control the phase of the reference signals to provide substantially coherent demodulation after receipt of the preamble.

DESCRIPTION OF THE DRAWING

FIG. 1e illustrates the phase relationship and information content of certain waveforms;

FIG. 6b is the block diagram of FIG. 3 modified for use with the correlator of FIG. 6a;

FIGS. 10–12 are a series of plots of a received MSK signal and of various signals occurring in the MSK receiver for particular values of initial phase offset between the received signal carrier and the local oscillator reference signals.

DETAILED DESCRIPTION

Figure 1:
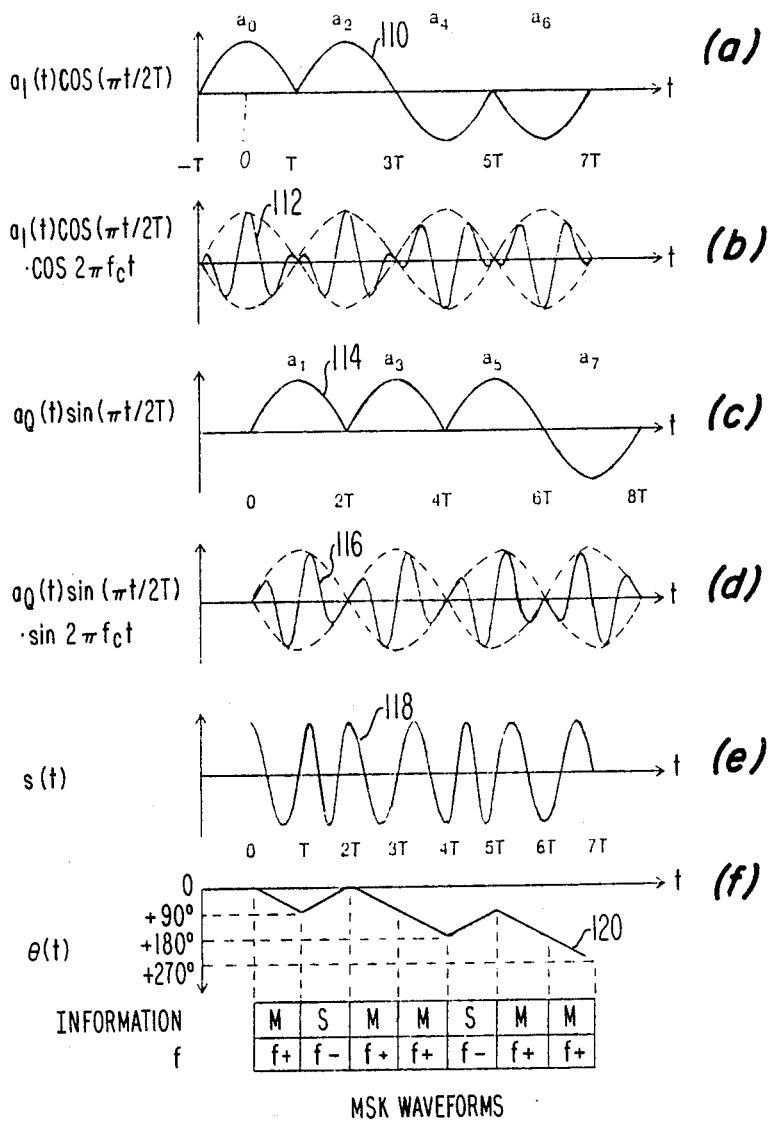
FIG. 1a through FIG. 1f illustrate general MSK waveforms.

Minimum-Shift Keying (MSK) is a variant of Offset Quadrature Phase-Shift Keying (OQPSK) in which sinusoidal weighting has been applied to the rectangular symbols of an OQPSK signal. FIG. 1 illustrates generally waveforms relating to MSK modulation by an arbitrary information signal consisting of the Mark (M) and Space (S) bit pattern designated in FIG. 1f. FIG. 1a illustrates as a voltage-time plot 110 a first (I) baseband component of the MSK information signal, and a second (Q) baseband component of the information is illustrated as 114 of FIG. 1c. Each half-sinusoid symbol or loop is designated $A_{2n}$, where n=0,1,2, .... Each half-sinusoid defines one symbol. Thus, the I baseband MSK signal 110 as illustrated defines four symbols occurring in a time period of 8T. FIG. 1b illustrates as a voltage-time waveform 112 the result of multiplying a carrier by waveform 110. Similarly, waveform 114 of FIG. 1c illustrates the Q baseband component voltage-time relationship defining four symbols $a_n$, also in a time 8T. It will be noted that the half-sinusoids $a_{2n}$ of I waveform 114 are 90° phase-shifted relative to the Q half-sinusoids $a_n$ of waveform 110. The quadrature arrangement allows multiplexing of the two signals 110, 114 into one MSK signal. FIG. 1d illustrates as a waveform 116 the modulated carrier resulting from multiplying a phase-shifted carrier by waveform 114 of FIG. 1c. Waveform 118 of FIG. 1e illustrates the sum or resultant carrier resulting from adding together the modulated carriers 112 and 116. The sum carrier represents modulation of a carrier by the interleaved bit patterns

M S M M S M M

Since the half-sinusoids 110 and 114 are in phase quadrature, and the phase-reversals occurring in the signals of waveforms 112 and 116 occur at minimum-amplitude points, the summation waveform 118 is a constant-amplitude phase-shifted carrier. The finite rise and fall times of the data and the data asymmetry inevitably present in practical situations have a minimal effect on the MSK performance. Phase plot 120 of FIG. 1f represents the cumulative phase change relative to the condition at time t=0 for carrier 18 modulated with the illustrated Mark-Space information. FIG. 1f also designates with ± symbols the modulated carrier frequency relative to the nominal carrier frequency $f_c$.

In a practical application, the binary data MSK-modulated onto a carrier as represented by signal 118 will be translated to a predetermined frequency band for transmission. For example, when the information bit rate is 1200 bps and carrier 118 has a nominal frequency of 36 kilohertz (KHz), the Mark and Space frequencies are displaced from the carrier frequency by 1200/2=±300 Hz. For a situation in which the information is to be transmitted over a satellite channel, MSK-modulated 36 KHz carrier 118 is translated into the gigahertz range for transmission to the satellite and is returned to an earth station at some other gigahertz frequency. Carrier 118 is ultimately sent to a receiver which includes a tuner, converter and an intermediate-frequency (IF) amplifier, and appears as an intermediate frequency signal which is applied to an analog-to-digital converter (ADC). The intermediate frequency is selected to be 36 KHz, so that the MSK signal applied to the ADC corresponds to the MSK signal as modulated, except for the effects of noise resulting from transmission.

When burst communications are used, such as for frequency-hopping applications, it is imperative that the demodulator lock onto the nominal carrier as quickly as possible so as to enable the data to be demodulated before the end of the burst. It is possible to demodulate the signal without locking onto the phase of the suppressed carrier, but as is known this results in degraded signal-to-noise performance.

According to the invention, each burst of MSK-modulated data is preceded by a MSK-modulated predetermined preamble such as preamble 210 of FIG. 2a. The baseband I and Q components of the preamble are illustrated as 214 of FIG. 2c and 216 of FIG. 2d, respectively. The phase characteristic of a carrier modulated with preamble 210 is illustrated as waveform 212 of FIG. 2b. Phase characteristic 212 can be understood by comparison of FIGS. 2a and 2b. The first positive (+) portion of waveform 210 at the left of FIG. 2a represents a succession of three Mark intervals, and the next negative-going portion to the right of the three Mark intervals represents a succession of three Space intervals. During each of the three Mark intervals, the MSK-modulated carrier has a frequency of 36.3 KHz, which is higher than the nominal carrier frequency of 36 KHz. Therefore, the phase of the MSK-modulated carrier progressively increases relative to the nominal carrier frequency and defines the first positive-slope portion at the left of waveform 212. During the next three following Space intervals, the MSK modulated carrier frequency is 35.7 KHz, which is lower than the nominal carrier frequency, and also lower than the Mark-modulated frequency, and therefore the phase progressively decreases. Thus, waveform 212 represents the accumulated phase resulting from progressive phase increases during Mark intervals and progressive decreases during Space intervals.

Figure 2:
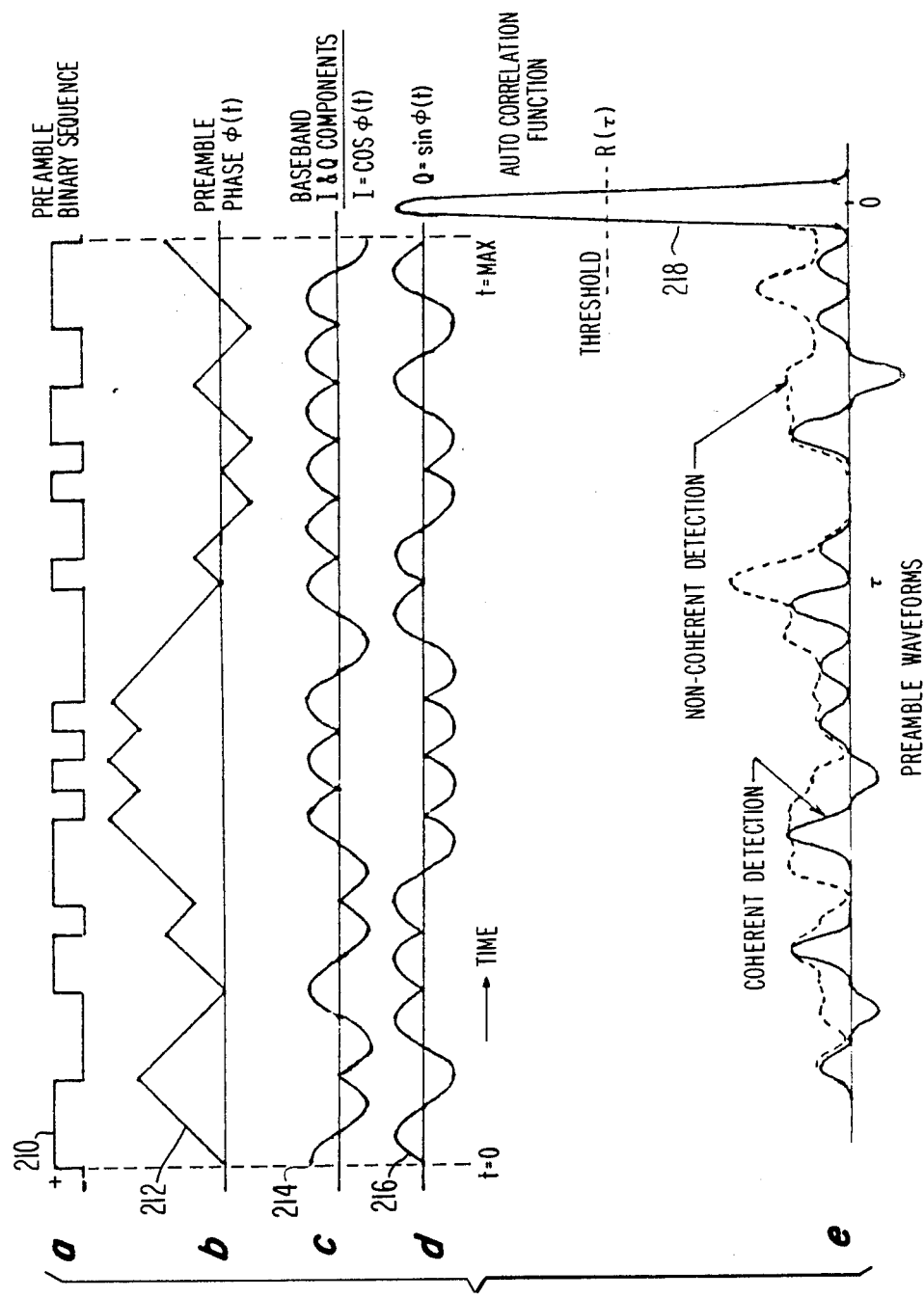
FIG. 2a illustrates an arbitrary binary preamble,
FIG. 2b its MSK phase characteristic,
FIGS. 2c and 2d its baseband signal components, and
FIG. 2e the autocorrelation function.
Figure 3:
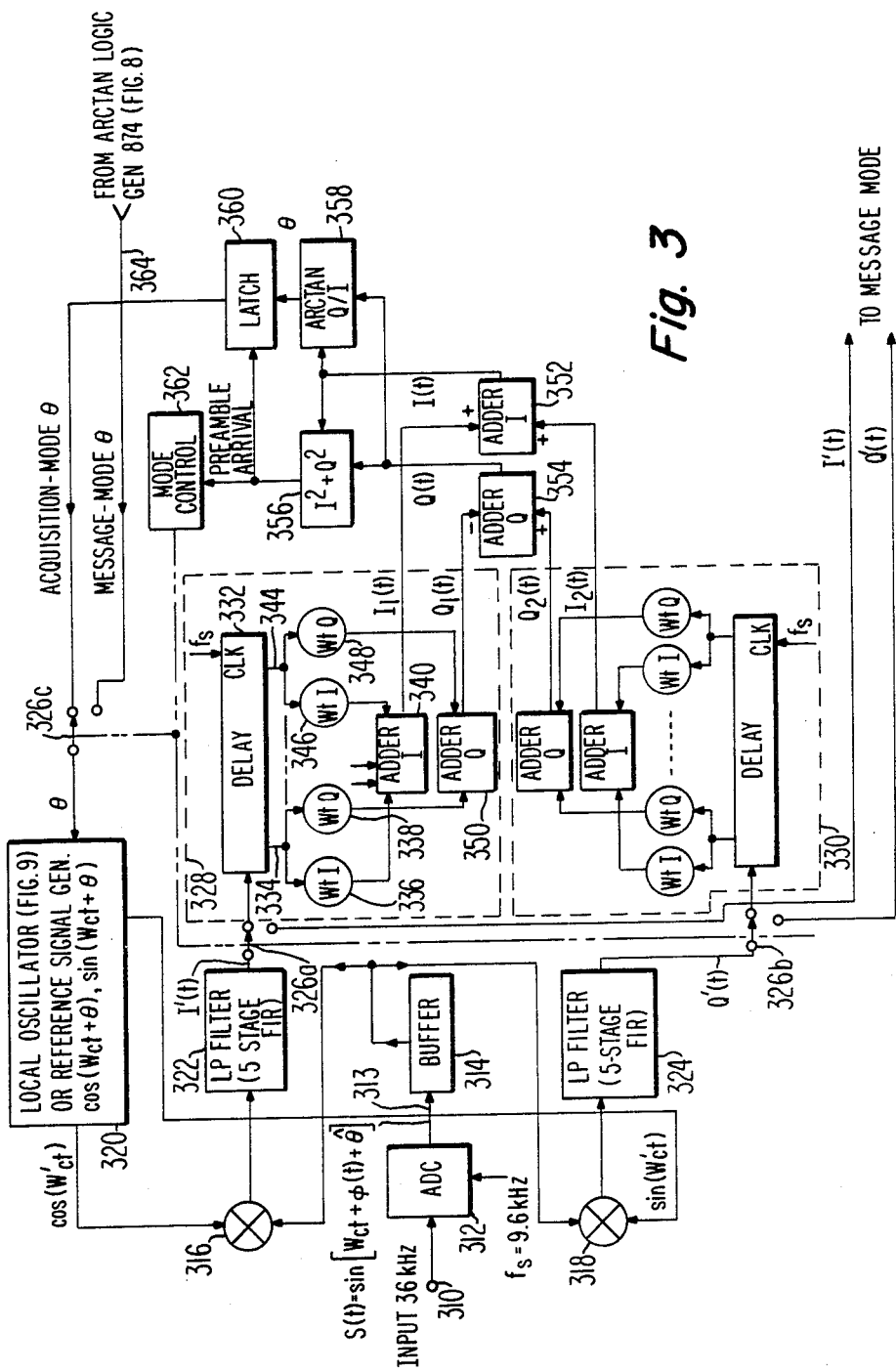
FIG. 3 is a functional block diagram of the phase acquisition portion of a receiver for MSK-modulated signals.

Referring now to FIG. 3, bursts of MSK-modulated carrier at the I.F. frequency (assumed to be 36 KHz) are applied to an input terminal 310 (at the left of FIG. 3) of a demodulator according to the invention. The MSK-modulated carrier is modulated by a binary preamble sequence described in conjunction with FIGS. 2a-d, followed by binary data. Only a portion of the demodulator is illustrated in FIG. 3. The portion illustrated in FIG. 3 is that portion required to describe the demodulation reference signal phase acquisition mode of operation. The IF signal applied to input terminal 310 has an amplitude-frequency spectrum characteristic 408 such as that illustrated in FIG. 4a, including a sideband 410 centered at the IF frequency $f_{IF}$ which may be centered on the original MSK carrier frequency $f_o$ and which is therefore in effect the original modulated MSK signal. Spectrum 408 also includes a negative-frequency component 411. The MSK signal is applied from terminal 310 to an analog-to-digital converter (ADC) 312, to which a sampling signal at a sampling frequency $f_s$ of 9.6 KHz is also applied. ADC 312 digitizes the signal and creates on lead 313 a digital signal representing an analog signal having a spectral distribution 412 such as that illustrated in FIG. 4b. Distribution 412 includes a number of sidebands centered at various frequencies, two of which sidebands designated 413, 413' are centered at frequencies of $-f_c$ and $+f_c$, respectively. The digital signal on lead 313 may be in serial form, in which case lead 313 consists of a single conductor, or the digital signal may be in parallel form, in which case lead 313 represents a number of conductors. For simplicity, a lead is hereafter referred to simply as a "conductor". The digitized signal from ADC 312 is applied by way of a buffer 314 to a pair of mixers or multipliers 316, 318. Mixer 316 receives at a second input terminal from a controllable local oscillator 320 a reference signal cos $(W'_c t)$ at a frequency $f_c$ of 2,400 Hertz (Hz), and mixer 318 receives at its second input terminal from generator 320 a second reference signal sin $(W'_c t)$ also at 2,400 Hz but phase-shifted by 90° with respect to cos $(W'_c t)$. The local oscillator frequency $(f_c)$ of 2,400 Hz is selected to up-convert sideband 413 of the sampled spectrum 412 to baseband for further processing. It should be noted that during the reference signal phase acquisition mode of operation the local oscillator reference signals are not necessarily in-phase (for the sine, or in phase quadrature for the cosine) with the nominal 2,400 Hz carrier of sideband 413 being converted, and may even be at a slightly different frequency. Thus, the local oscillator signals produced by generator 320 may be offset from the nominal 2,400 Hz carrier by a phase difference which may be progressive in the case of a slight frequency error.

Figure 4:
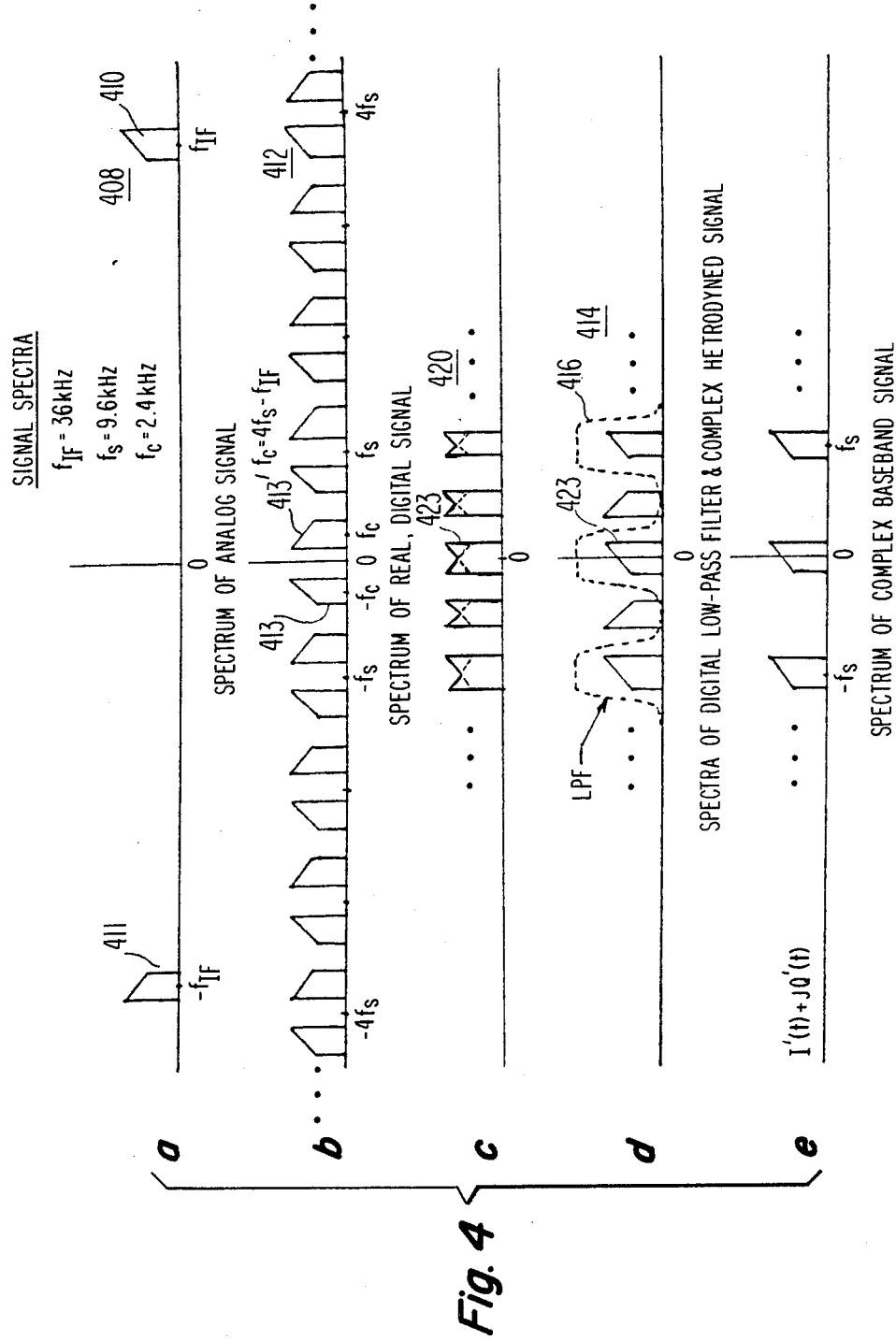
FIGS. 4a–4d illustrate amplitude-frequency spectra of signals associated with the receiver of FIG. 3.

The output of mixer 316 is a frequency-shifted spectrum represented generally as 420 of FIG. 4c. Spectrum 420 at the output of mixer 316 includes components originating from both sidebands of spectrum 408. For example, sideband 423 centered near zero frequency includes the sum of sidebands 408 and 410. The output of mixer 318 is similar, and is not illustrated separately. The outputs of mixers 316 and 318 taken together represent a spectrum such as that illustrated by solid lines in FIG. 4d and designated generally as 414. Spectrum 414 is the heterodyned complex signal. The outputs of mixers 316 and 318 are applied to a filter arrangement including a pair of low-pass (LP) filters 322 and 324; respectively, each of which may take the form of a five-stage finite-impulse-response (FIR) filter, which has an amplitude-frequency characteristic illustrated as broken line 416 in FIG. 4d. The output of filter 322 is a signal $I'(t)+jQ'(t)$—referred to hereinafter as $I'(t)$— which is one of two components of a complex baseband signal illustrated in FIG. 4e as 418. It can be seen that the negative-frequency portion 411 of the spectrum 408 is removed by the up-conversion and filtering to produce the spectrum illustrated as 418 in FIG. 4e. The output of LP filter 324 produces a signal $Q'(t)+jI'(t)$ (referred to hereinafter at $Q'(t)$). Signal $Q'(t)$ is the second component of the complex baseband signal illustrated as 418. As noted, signals $I'(t)$ and $Q'(t)$ are two components of a complex signal. So long as the phase of the local oscillator signal sin $(W'_c t)$ applied to mixer 318 is not equal to the phase of the nominal 2,400 Hz carrier of spectral component or sideband 423 of spectrum 414 (and the local oscillator signal cos $(W'_c t)$ applied to mixer 316 is therefore not in phase quadrature with the nominal 2,400 Hz carrier), signal $I'(t)$ at the output of low pass filter 322 will include information derived from both the original baseband I component and from the original baseband Q component, and the $Q'(t)$ output of low-pass filter 324 will similarly consist of an admixture of both I and Q signals. The $I'(t)$ signal is applied through filter 322 to a preamble-matched filter 328 by way of terminals of a mode controlling switch 326a. Similarly, signal $Q'(t)$ is applied from filter 324 to a preamble-matched filter 330 by way of a mode controlling switch 326b ganged with switch 326a and with a switch 326c. Switches 326a-c are illustrated in the position for acquisition-mode operation. Each preamble-matched filter is basically a correlator responsive to the preamble portion of the signal. Preamble-matched filters 328 and 330 are identical, and therefore only filter 328 is discussed in detail.

Preamble-matched filter 328 includes a delay 332 to which the signal $I'(t)$ is applied and clocked through at the sampling rate. In the example, the bit rate is 1200 bps, and the sample rate is 9600 samples per second, and there are therefore eight samples per bit or 16 bits per MSK symbol. In order to accomodate each sample of a 32-bit preamble with eight samples per bit, delay 332 must include 256 stages. A tap 334 is coupled to the first stage of delay 332, and a tap 344 is coupled to the last stage of delay 332. There are a total of 256 such taps, one for each stage of delay 332, only the first and last of which are shown. Each tap is coupled to a weighting circuit, which in analog embodiments may be simply a resistor and which in a digital version is a multiplier. Tap 334 is coupled to an I weighting circuit 336 and to a Q weighting circuit 338. Tap 344 is coupled to an I weighting circuit 346 and to a Q weighting circuit 348. Other I and Q weighting circuits (not shown) are associated with the 254 additional taps coupled to the remaining 254 stages of delay line 332.

Each MSK symbol stored in delay 332 is represented by sixteen samples contained in sixteen successive stages. As mentioned previously, and as illustrated in FIG. 1, each MSK symbol is a pulse having a half-sinusoid amplitude function. Thus, at the moment the preamble fills delay 332, tap 334, which is the first tap, will receive a signal having peak amplitude, since it is coupled to a stage which at that instant contains a signal amplitude representative of the middle of a half-sinusoid (see FIG. 2c at time t=max). Thus, at the moment that the preamble fills delay 332, tap 334 conveys maximum information. Consequently, I weighting circuit 336 has maximum coupling. Similarly, the I weighting function is zero for the eighth stage (eight stages corresponds to one-half MSK symbol), since at the moment that the preamble fills delay 332, there is a zero amplitude function at the eighth stage. Zeroes in the I weighting occur every 16 stages after the eighth stage, corresponding to the successive nulls of the signal. The peaks of the I weighting occur half-way between each pair of zero-weight taps, corresponding to the points at which the I MSK symbols are a maximum when the preamble fills the delay. The coupling of I weighting circuit 346 is a maximum, because it receives the peak of a half-sinusoid at the moment the preamble exactly fills delay 332 (see FIG. 2c at time $t=0$). The Q weighting 338 for tap 334, however, is a minimum, for the Q component at tap 334 is at its zero value at the moment that the preamble fills the delay. Similarly, a zero in Q weighting occurs every sixteen stages thereafter, and the peaks of Q weighting are half-way between. Each of I weighting circuits 336–346 and Q weighting circuits 338 and 348 are weighted in accordance with the amplitude of those signals expected to be in the particular stage to which the tap is coupled at the moment the preamble completely fills delay 332. This weighting is discussed in further detail below.

The 256 I weighting circuits 336–346 are coupled to an I adding circuit 340, and the 256 Q weighting circuits 338–348 are coupled to a Q adding circuit 350. I adder 340 and Q adder 350 sum together with weighted I and Q outputs of the I and Q weighting circuits, respectively, to produce signals $I_1(t)$ and $Q_1(t)$, respectively. If local oscillator reference signal sin ($W'_c t$) at the output of local oscillator generator 320 is in-phase with the nominal carrier of sampled input signal s(t) at the output of buffer 314, then the magnitude of the $I_1(t)$ signal at the output of adder 340 will be large at the moment that the preamble just fills delay 332, and the signal $Q_1(t)$ at the output of adder 350 will be small. Similarly, if cos ($W'_c t$) applied to mixer 316 is in-phase with s(t) at the output of buffer 314, then at the moment the preamble fills delay 332, signal $Q_1(t)$ at the output of adder 350 will be large and signal $I_1(t)$ at the output of adder 340 will be relatively small. It should be noted that as the phase difference between the local oscillator signals relative to s(t) progresses through a 360° excursion, $I_1(t)$ goes from a maximum positive value through zero value to a negative maximum value and back to zero while $Q_1(t)$ goes from zero to a maximum positive value to zero and to a maximum negative value, as discussed in greater detail in conjunction with FIG. 5. Signal $I_1(t)$ from adder 340 is applied to a first input of an adder 352 together with a signal $I_2(t)$ from preamble-matched filter 330. Similarly, signal $Q_1(t)$ from adder 350 is applied to an inverting input of adder 354, and a signal $Q_2(t)$ is applied from filter 330 to a second, noninverting, input terminal of adder 354.

Figure 5:
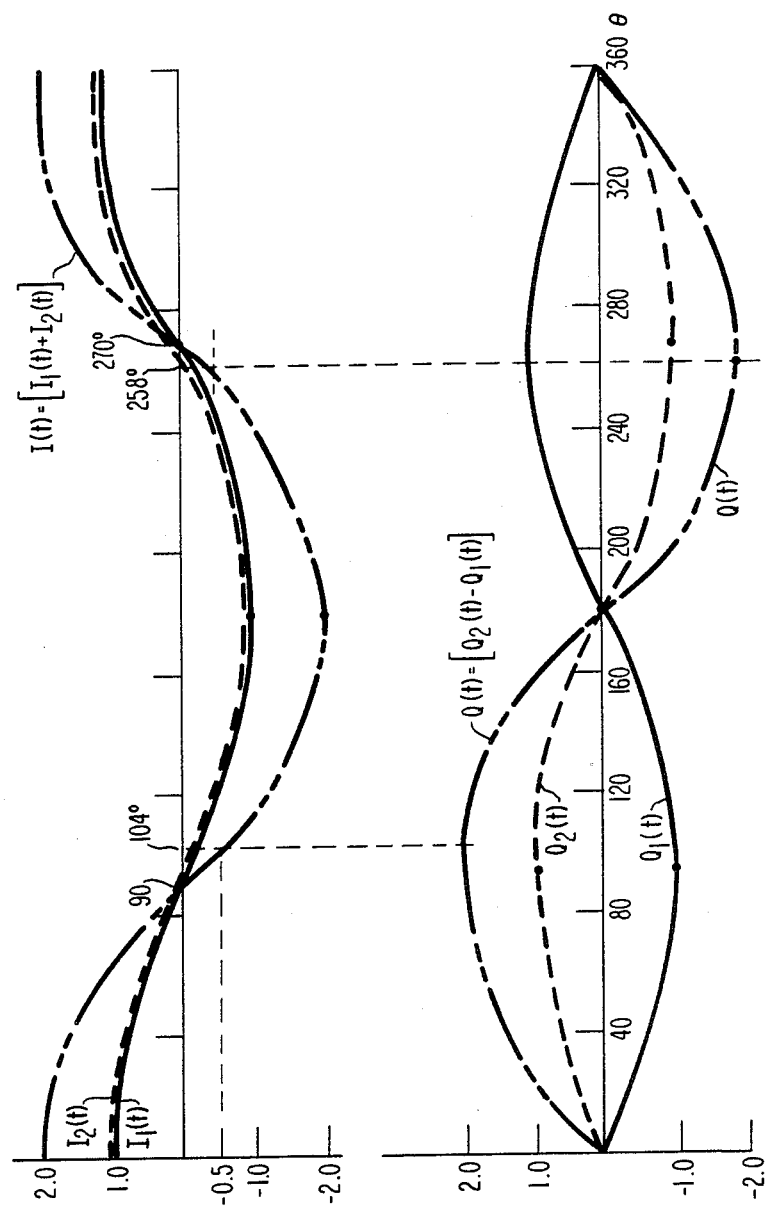
FIG. 5 illustrates the amplitude of I(t) and Q(t) signals produced by adders 352 and 354 of FIG. 3 as a function of the relative phase of local oscillator signals to received signal carrier in the arrangement of FIG. 3.

Each preamble-matched filter 328, 330 is a correlator responsive to the preamble to form at least one correlation peak signal illustrated as 218 of FIG. 2e at the instant that the preamble completely fills the correlator. As mentioned, preamble-matched filter 330 is identical to preamble-matched filter 328. Thus, the preamble fills the correlator delays at the same time, and the correlation peaks occur simultaneously. If it should happen that the local oscillator signal sin ($W'_c t$) applied to mixer 318 is precisely in-phase with the nominal carrier of the received signal s(t) (a condition of $\theta=0°$), signal I(t) reaches a positive peak magnitude, $Q_1(t)$ is zero, $I_2(t)$ has a maximum positive value and $Q_2(t)$ has zero magnitude at the moment of maximum correlation. Consequently, the signal I(t) of the output of adder 352 has a positive peak magnitude at the moment the preamble is received. If, on the other hand, the local oscillator signal sin ($W'_c t$) applied to mixer 318 is 180° out-of-phase with the nominal carrier of the received signal s(t) during the time the preamble is being received by the preamble-matched filters (condition $\theta=180°$), $I_1(t)$ and $I_2(t)$ will have a peak negative value, and $Q_1(t)$ and $Q_2(t)$ will have zero magnitude. If the local oscillator signal cos ($W_c t$) applied from local oscillator 320 to mixer 316 is in-phase with the carrier of the received signal ($\theta=90°, 270°$), signals $I_1(t)$ and $I_2(t)$ will have zero value, $Q_1(t)$ and $Q_2(t)$ will have a peak values of mutually opposite polarity, and the sum signal I(t) is zero and Q(t) is positive. FIG. 5 represents the various values of I(t) and Q(t) and their components for various phase relationships ($\theta$) of the local oscillator reference sine signal to the nominal carrier of the received signal s(t). It will be noted that I(t) and Q(t) as illustrated in FIG. 5 are sinusoids phase-displaced by 90°, so that the relative phase angle between the local oscillator reference sine signal and the carrier of the received signal may be identified by a unique relationship between I(t) and Q(t). For example, if I(t) has a value of $-0.5$ and Q(t) has near a peak positive value (near zero), the phase angle is identified as being about $180°-\arctan(2/-0.5)$ or $104°$ (taking into account the proper quadrant) whereas if I(t) has a value of $-0.5$ and Q(t) has near a peak negative value the phase angle $\theta$ is in the vicinity of $180°-\arctan(2/0.5)$ or $258°$. With this information, it is possible to correct the local oscillator to or near the desired phase angle ($\theta=0°$) in order to convert the incoming signal s(t) to baseband synchronously, and thereby achieve low-noise demodulation.

Signals I(t) and Q(t) from adders 352 and 354 of FIG. 3 are applied to logic illustrated by a block 356 for squaring each of the components and adding them together, and for comparing the squared added signals with a threshold level (illustrated as R($\tau$) in FIG. 2e) for establishing the moment at which the preamble has arrived and producing a time-of-arrival signal. The I(t) and the Q(t) signals are also applied to logic illustrated as a block 358 and labeled Arctan Q/I for establishing $\theta$, the relative phase angle between the nominal carrier of received signal s(t) and the local oscillator sine reference signal. This logic includes a divider to establish the quotient and a look-up table such as a ROM to find the corresponding arctan angle. The signal generated by arctan logic 358 is applied to a latch 360 in which the value of $\theta$ is latched by the preamble-arrival signal from logic 356 at the moment the preamble completely fills the preamble-matched filters. The latched value of $\theta$ is applied by way of switch section 326c to the $\theta$ input terminal of local oscillator 320 to add the value of $\theta$ to the local oscillator signals to slew the reference signals to a value which causes local oscillator signal sin ($W_c t+\theta$) to be in-phase with the carrier component of input signal s(t). Local oscillator 320 is described in detail in conjunction with FIG. 9. The preamble arrival signal generated by logic 356 is also applied to a mode control circuit 362 which after a momentary delay operates switches 326a, 326b and 326c to their alternate operating state (not shown) to switch from the acquisition operating mode to a message operating mode. The momentary delay allows the message-mode phase control circuits (described below) to stabilize. The message-mode operation includes bit decision described in conjunction with FIG. 7 and also includes phase tracking, which is described in conjunction with FIG. 8.

Figure 6A:
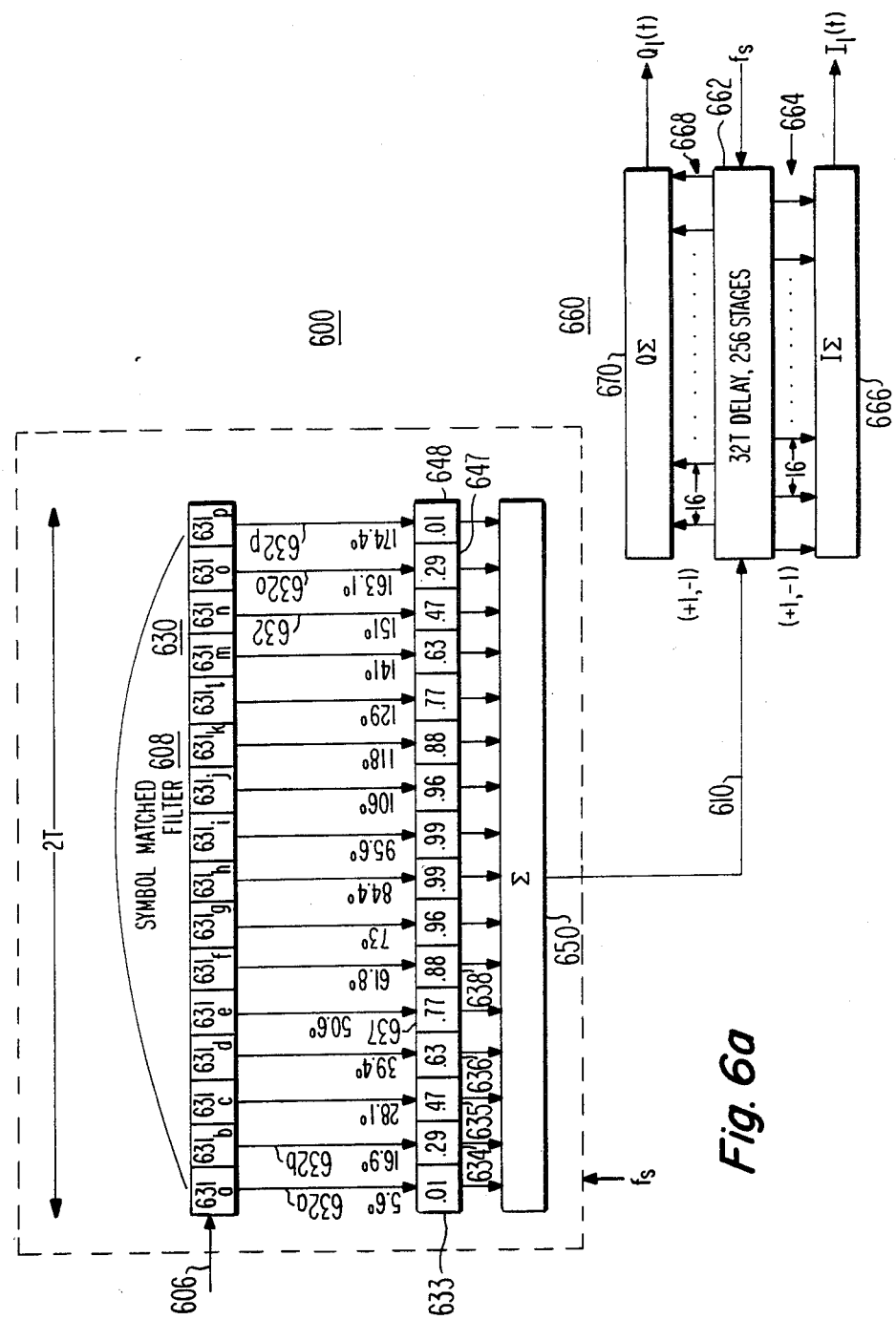
FIG. 6a is a functional block diagram of a preferred alternate correlation arrangement suitable for use in the arrangement of FIG. 3 and adapted to be used in conjunction with bit-decision-logic and phase-tracking portions of the MSK receiver illustrated in FIGS. 7 and 8.

While the arrangement of FIG. 3 is satisfactory for acquisition, a slightly different configuration of correlators 328 and 330 is found to be advantageous when considering functions of the receiver other than phase acquisition. FIG. 6a illustrates a preferred embodiment of a correlator 600. It is noted that correlator 328 of FIG. 3 includes a number of taps 334-344 established as the product of the number of bits in the preamble (32 in the example) multiplied by the number of samples per bit (eight in the example), for a total of 256 taps. Each tap is associated with two multipliers (for example, tap 334 is associated with multipliers 336 and 338). While some of the multipliers multiply by zero and can therefore be eliminated, there may nevertheless be several hundred multipliers in each correlator. Correlator 600 illustrated in FIG. 6a reduces the number of multipliers required to sixteen. In FIG. 6a, filtered signal I'(t) is applied by way of a conductor 606 to symbol-matched filter 608. Filter 608 includes a delay designated generally as 630 which has sixteen stages 631a-631p, which together represent the duration of one MSK symbol (a duration of 2T, by reference to FIG. 1). Delay 630 is therefore capable of storing one MSK symbol. Since each symbol is represented by a half-sinusoid or 180°, each of the sixteen stages of delay 630 represents one-sixteenth of 180°, or 11.25° per stage. Each stage 631a-631p of delay 630 is tapped by one of sixteen taps 632a-632p and each tap may be considered to sample a value representing the magnitude of a sinusoid at an angle in the middle of the range of angles represented by the corresponding stage to which the tap is coupled. For example, stage 631a of delay 630 has a delay of 11.25°, and therefore may be considered to have zero degrees at its input end and 11.25° at its output end, and to be tapped by tap 632a at an intermediate point, which would represent 5.625°. Applying the same logic to the remainder of the taps, tap 632b represents about 16.875° (5.625°+11.25°) and the taps 632c-632p associated with stages 631c-631p represent approximately the angles noted (in rounded numbers) adjacent each tap. Each of the taps 631a-632p is coupled to one of sixteen multipliers 633-648 each of which multiplies the signal on its associated tap by the sine of the angle sampled by the tap, as defined above. For example, multiplier 633 multiplies the signal on tap 681 derived from stage 631a by the sine of 5.6°, which is about 0.1. The multiplier values for multipliers 633-648 are indicated (also in rounded numbers) in FIG. 6a. The outputs of multipliers 633-648 are applied to a summing network illustrated as 650 which adds together the multiplied signals and applies the sum over a conductor 610 to a preamble-matched filter 660. Preamble-matched filter 660 includes a delay 662, which has a duration of 32T, suitable for storing 16 MSK symbols. Since the symbols entering delay 662 have all been weighted in filter 608 by the sinusoidal symbol shape, no further multiplicative weighting is necessary. Delay 662 includes 256 stages (not shown), each stage having a duration of t/8. One tap of a set of 16 taps designated together as 664 couples the first stage of delay 662 to an I summing network 666, with the remaining 15 taps of set 664 being separated by 2T (16 stages). Thus, every 16th stage of delay 662 is tapped by a tap of set 664 and coupled to summer 666. A further set of 16 taps designated together as 668 is coupled to those stages (also not individually shown) of delay 662 half-way between those stages tapped by taps 664. Taps 668 are therefore also separated by 2T or 16 stages. Taps of set 668 are offset by eight stages from adjacent taps of set 664. A Q summing circuit 670 adds together the signals from taps 668 to produce the $Q_1(t)$ signal.

The sets of taps 664, 668 coupled to delay 662 of FIG. 6a do not require weighting by multipliers, but still require a polarity selection indicated by the parenthetical (+1,−1) notation beside each tap set. This notation represents the fact that each tap of set 664 couples to summer 666 either the noninverted signal from the associated stage of delay 662 when that stage is expected to contain a positive-going MSK symbol at the instant at which the preamble completely fills the delay, or couples to summer 666 an inverted version of the signal on its associated stage of delay 662 when that stage is expected to contain a negative-going MSK symbol at the instant at which the preamble completely fills delay 662. Taps 668 are similarly polarized. Those skilled in the art will recognize that this polarization may be accomplished by coupling each delay stage to an inverting or to a noninverting input terminal of the associated summer.

Figure 6B:
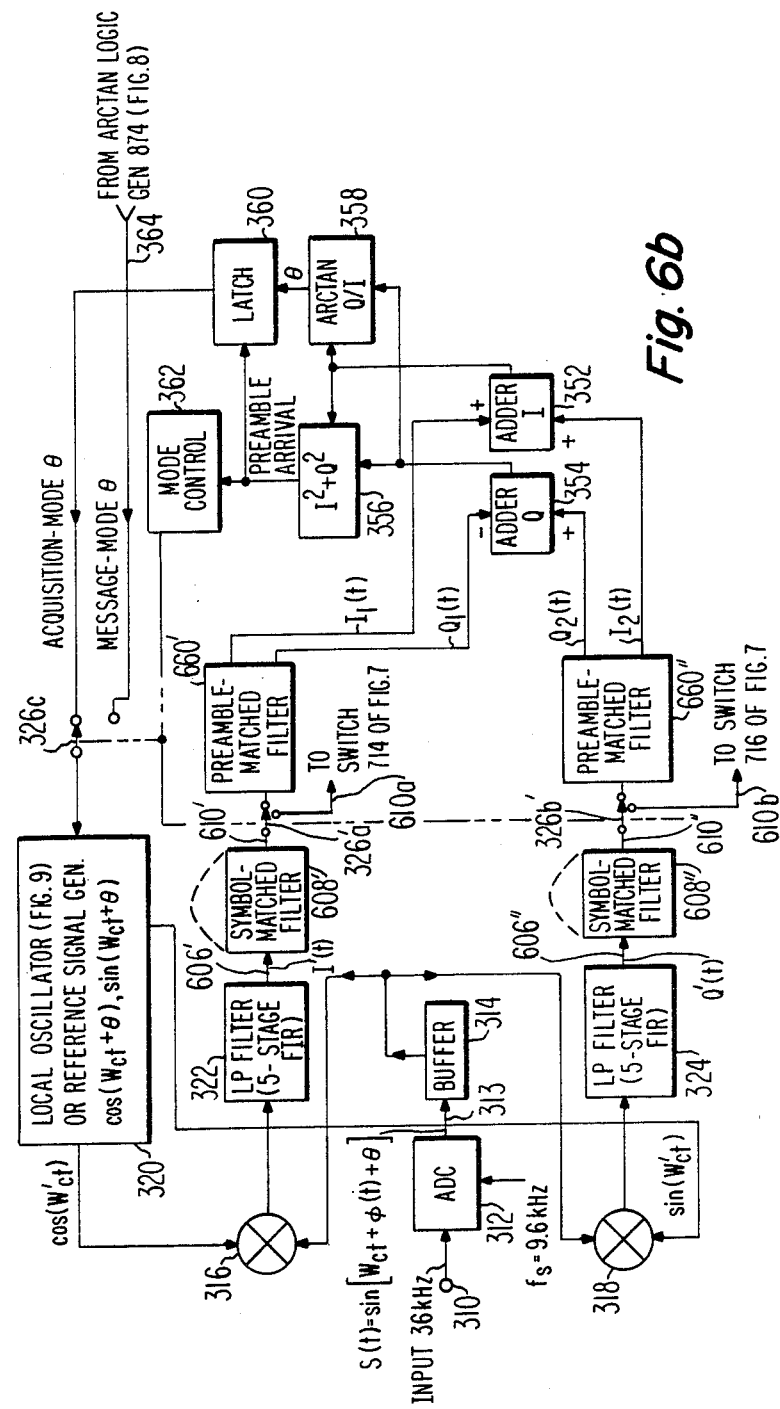

The $I_1(t)$ and $Q_1(t)$ signals generated by the correlator 600 correspond to the $I_1(t)$ and $Q_1(t)$ signals generated by the correlator arrangement 328 of FIG. 3. A second correlator similar to that illustrated in FIG. 6a is required in a receiver to generate $I_2(t)$ and $Q_2(t)$ signals in order to perform MSK demodulation. The $I_1(t)$, $I_2(t)$, $Q_1(t)$ and $Q_2(t)$ signals are used in the same way as indicated in FIG. 3. FIG. 6b illustrates the arrangement of FIG. 3 modified to use the correlators described in FIG. 6a. It should particularly be noted that the locations of switches 326a' and 326b' in FIG. 6b (corresponding to switches 326a and 326b of FIG. 3) are coupled between the preamble-matched filters (608) and the symbol-matched filters (660).

Figure 7:
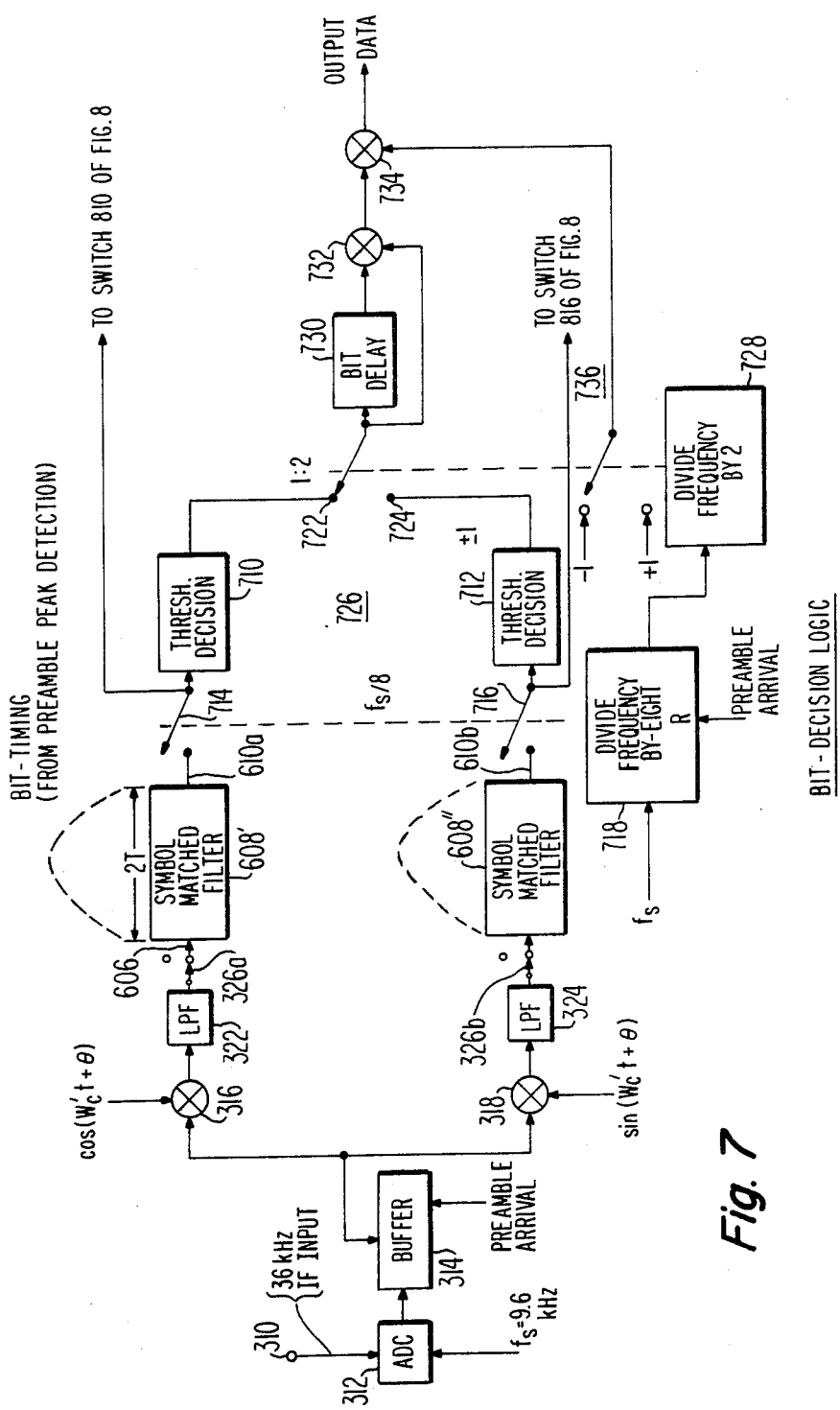
FIG. 7 is a functional block diagram of the bit-decision portion of the MSK receiver together with portions of the arrangement of FIG. 6b with which it cooperates.

FIG. 7 is a block diagram illustrating the bit-decision logic. Portions of the arrangement of FIG. 7 correspond to portions described previously and are given the same reference numbers. The function of the bit decision logic is to decide for each bit whether it is a Mark (+1) or a Space (−1). This decision is made once during each bit interval (once during each eight samples). In the bit-decision mode of operation, switches 326a' and 326b' (FIG. 6b) couple signals from symbol-matched filters 608' and 608" to sampling switches 714 and 716, respectively. Threshold decision logic 710 and 712 of FIG. 7 are coupled by means of sampling switches 714 and 716 to receive the output signals from symbol-matched filters 608' and 608", respectively. Symbol matched filters 608' and 608" correspond to filters 608' and 608" of FIG. 6b. Ganged switches 714 and 716 are closed during every eighth sampling clock cycle by a switch-controlling divide-frequency-by-eight circuit 718 driven by the sampling clock fs. Frequency divider 718 is synchronized with the end of the preamble and the beginning of the data by the application of the preamble arrival signal from logic 356 of FIG. 3 to the reset input terminal of the divider. Since the logic required to generate the preamble arrival signal itself requires time in which to operate, the preamble arrival signal is slightly delayed relative to the beginning of data. This may result in a slight increase in noise, which may be compensated for by moving (by means not shown) a tap point 720 on buffer 314 to an earlier point upon receipt of a preamble arrival signal. Switch 714 samples each I bit at the peak of the symbol and applies the signal so sampled to threshold decision logic 710, which produces a signal indicative of Mark or Space which is applied to input terminal 722 of a singlepole, double-throw switch 726. Similarly, switch 716 samples the output of filter 608" and applies the signal so sampled to a threshold decision logic circuit 712 to produce a signal representative of Mark or Space, which is applied to terminal 724 of switch 726. Since switches 714 and 716 are ganged, sampling and subsequent threshold decisions occur simultaneously. However, the baseband I and Q signal are in phase quadrature, so do not reach their peaks at the same time. Consequently, as the time switch 714 samples the peak representing the center of an I symbol, switch 716 is sampling a zero crossing of the Q signal and consequently the threshold decision made by logic 712 has no validity. Similarly, at the time that switch 716 samples the peak or center of a Q symbol, switch 714 is sampling an edge of an I symbol, and the threshold decision by logic 710 is at a time that is not reliable. Consequently, switch 726 is operated so as to sample every other threshold decision received from logic 710 and 712. A divide-by-two circuit 728 further divides the divided-by-two signal from divider 718 and controls switch 726 so as to couple the threshold decision of logic 710 for further processing by bit delay 730 and multiplier 732 during that interval when switch 714 samples the center of an I symbol from filter 608', and couples the output of threshold logic 712 for further processing during those alternate sampling periods during which switch 716 samples the center of the Q symbol from filter 708". Thus, alternating I and Q bit-decision information is coupled to bit delay 730 and to multiplier 732 for multiplying together successive I and Q bits and the resulting signal is applied to a further multiplier 734 for alternate multiplication by $\pm 1$ signals selected by a switch 736 ganged to switch 726 in order to invert every other output from multiplier 732. The resulting data is available from application to error-correcting circuitry, if desired, or for other use.

The bit-decision logic described in FIG. 7 is quite suitable and produces accurate decisions so long as the phase of the local oscillator signal remains fairly close to the phase of the nominal carrier of the MSK signal. The phase relationship during the phase acquisition process was brought to within a predetermined limit, and provides accurate bit decisions immediately after the arrival of the preamble. However, after the preamble interval, the preamble is no longer available for correlation, and therefore $\theta$ (the phase deviation between the sine reference signal and the nominal MSK carrier) cannot be calculated therefrom. It might be expected that during the message mode of operation the phase of the reference signals from local oscillator 320 would gradually depart from the nominal MSK carrier phase, and that demodulation would therefore gradually become noisy.

The correlators described in conjunction with FIGS. 3 and 6 depend upon the application of a known preamble to a correlator structure which responds to that particular preamble. Clearly, the same type of correlation may be accomplished using the data stream as the input signal once the bit decisions have been made and the characteristics of the data stream are known. This may be accomplished by applying the data stream to a correlator in which the "taps" are continually "adjusted" or adapted based upon the bit decisions. Such a data stream applied to an adaptively adjusted correlator produces the information necessary for application to an arctangent generator for generating $\theta$, which can then be applied for control of the local oscillator for maintaining the relative phase of the reference sine signal and the MSK carrier within the limits required for accurate decoding of the MSK signal.

Figure 8:
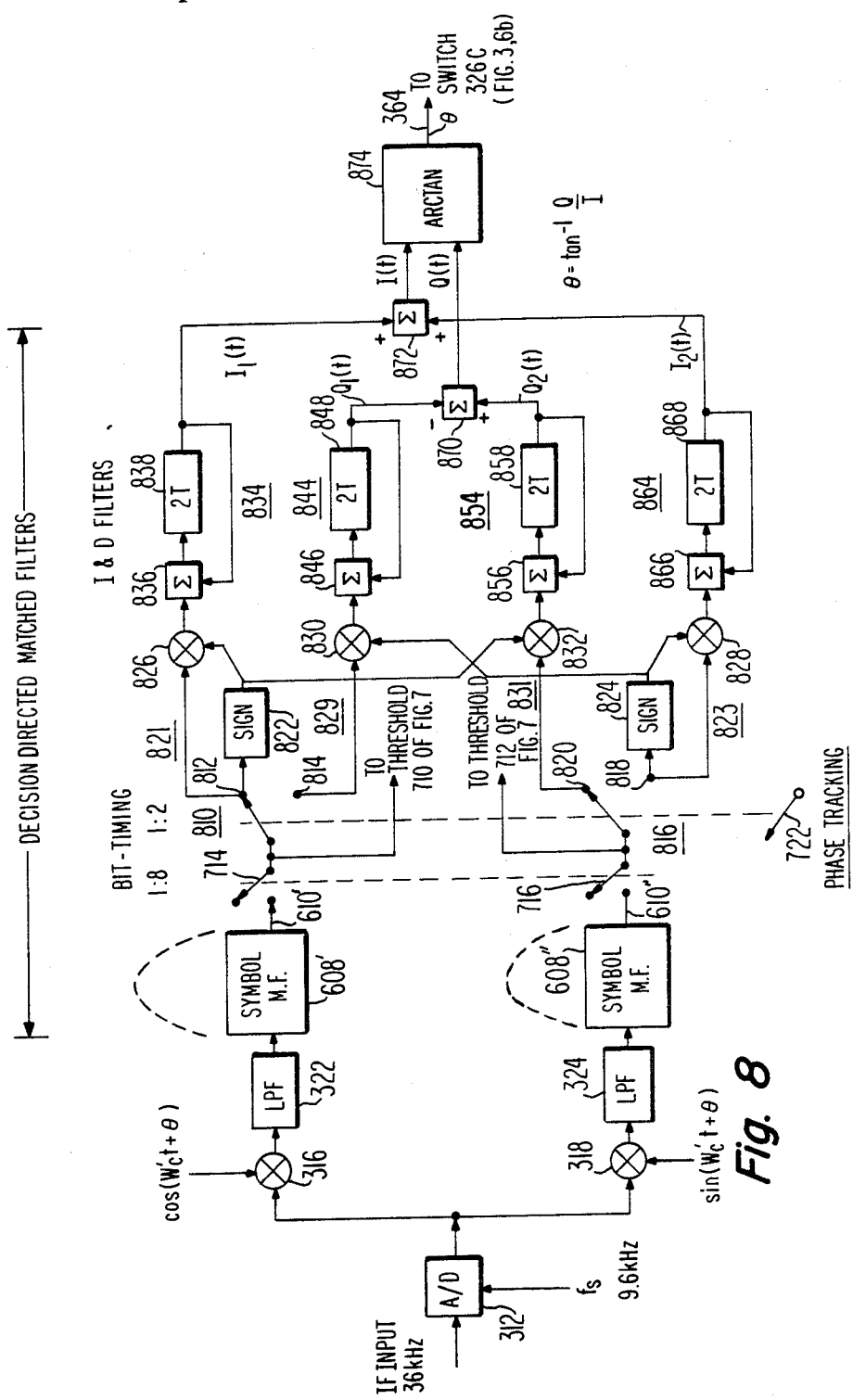
FIG. 8 is a functional block diagram of the phase tracking portions of the MSK receiver together with portions of the arrangement of FIG. 7 to which it relates.

FIG. 8 illustrates in block-diagram form the phase tracking portions of the MSK receiver together with portions of the block diagram of FIG. 7 to which it relates, and is equivalent to an adaptive correlator responsive to the bit stream. In FIG. 8 the I signal sampled during the center of the symbol and at the beginning (end) of a symbol by switch 714, as described above, is applied alternately to terminals 812 and 814 of a switch 810, which is operated in synchronism with a switch 816 and with switch 722. As mentioned, switch 722 operates every eight samples so as to sample the alternate threshold decision signals generated at the peaks of the I and Q symbols. Consequently, the I component of the signal from filter 608' together with any residue of Q signal is applied to terminal 812 and any residual Q component of the filter 608' signal is sampled during the time of the center or peak of the Q component and applied to switch terminal 814.

Circuit 821 receives signal from terminal 812 and performs an absolute-value function. The signal received at terminal 812 together with its sign bit is applied to a first input terminal of multiplier 826. The sign bit is branched off and applied separately by way of sign branching circuit 822 to a second input terminal of multiplier 826. When the sign of the the input signal is +, the output of multiplier 826 is equal to the input signal. When the sign of the signal input to absolute-value circuit 812 is −, the multiplier inverts it. Absolute-value circuit 821 performs for the arrangement of FIG. 8 the function performed in the arrangement of correlator 600 by the (+1, −1) polarization of the taps to match the MSK preamble symbol polarity.

The summing function performed by summer 666 of correlator 600 is performed by an integrate-and-dump (I&D) filter or accumulator designated generally as 834 which accumulates for a predetermined interval. Filter 834 includes an adder 836 which receives signals from multiplier 826 and a register 838 which receives the signal from adder 836 and delays the signal for 2T (16 samples) before reapplying it to a second input of adder 836. This arrangement generates a sum representing past values of signal, which is the desired signal $I_1(t)$.

The signal applied by switch 810 to terminal 814 represents a sample taken in the I channel at the Q time, and therefore represents the cross-contamination of the demodulated signal because of error in $\theta$, the phase of the reference signal relative to the nominal carrier of the received signal. Since the bit decisions performed on this signal are liable to be untrustworthy, the sign bit applied to multiplier 830 of circuit 829 is derived from sign branching circuit 824, which takes the sign bit from a signal sampled at the peak of the Q symbol. The value of the Q signal contaminating the I channel is applied from multiplier 830 to a second accumulator 844, which operates as described in relation to accumulator 844, and is not further described. The output of accumulator 844 is the $Q_1(t)$ signal.

Absolute-value circuit 823 and circuit 831, and accumulators 854 and 864 are symmetrical with absolute-value circuit 821 and circuit 829, and accumulators 844 and 834, respectively, and their operation to produce $I_2(t)$ and $Q_2(t)$ is apparent. The $I_1(t)$ and $I_2(t)$ signals from accumulators 834 and 864, respectively, are applied to inputs of a summing circuit 872. The $Q_1(t)$ and $Q_2(t)$ signals from accumulators 844 and 854, respectively, are applied to inverting and noninverting inputs, respectively, of a summing circuit 870. The I and Q component signals from summers 870 and 872 are applied to an arctangent logic circuit 874 for calculating a value of $\theta$ by forming a signal representing the quotient of Q(t)/I(t), and applying the quotient to a look-up table which generates a $\theta$ signal representing the angle $\theta$ and its quadrant. The $\theta$ signal from arctangent generator 874 is applied by way of conductor 364 to switch section 326c of FIG. 3 or FIG. 6 for control of the phase of the sine and cosine reference signals generated by local oscillator 320 as described above in relation to the acquisition mode. Thus, in the message mode of operation, while data decisions are being made, the reference signal phase tracking arrangement of FIG. 8 continually monitors symbol cross-coupling between the I and Q channels and corrects the local oscillator to maintain the relative phase of the MSK carrier and the reference signal within predetermined limits.

Figure 9:
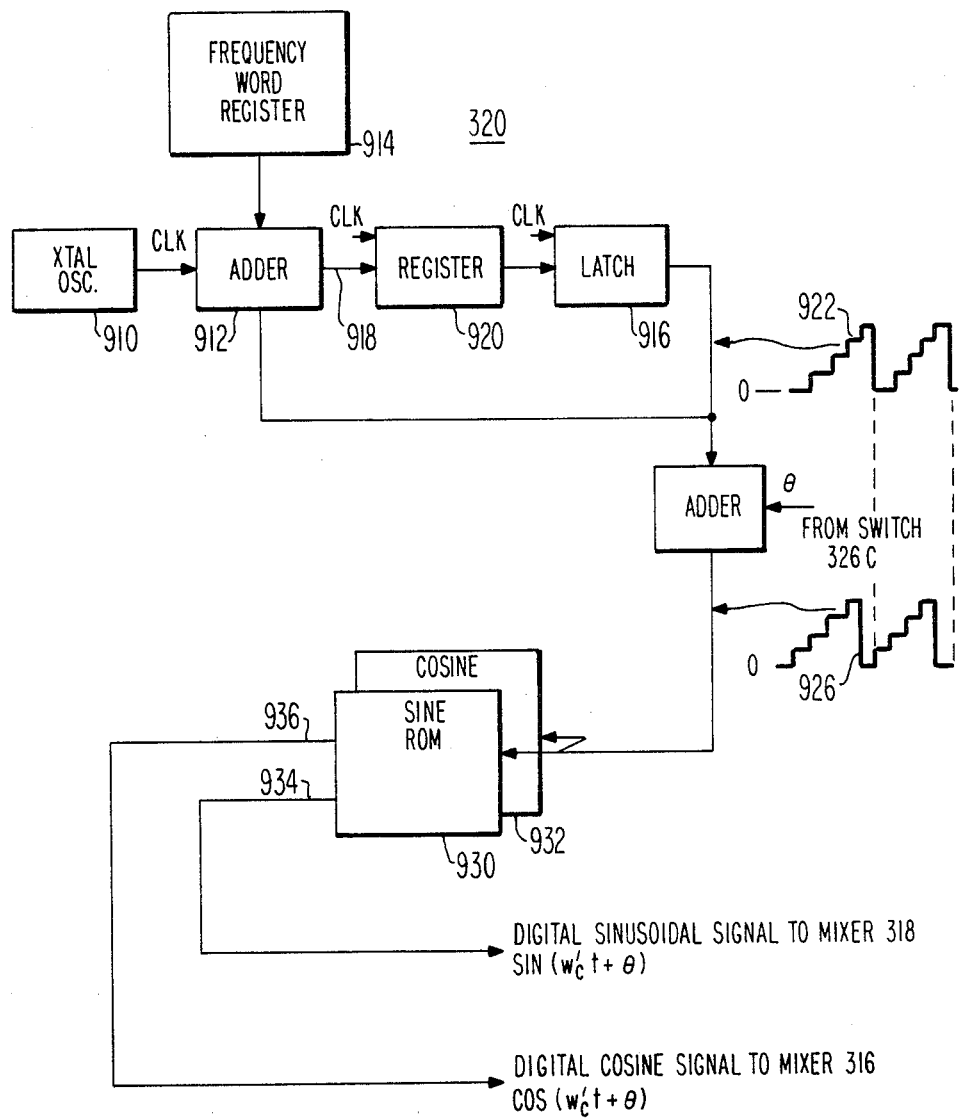
FIG. 9 is a functional block diagram of an embodiment of a local oscillator or reference signal generator suitable for use in the arrangements of FIGS. 3 and 6b.

FIG. 9 is a block diagram of local oscillator 320 of FIG. 3. In FIG. 9, a clock oscillator 910 operates at the sampling frequency $f_s$ equal to 9.6 KHz, and the clock signal is applied to clocked adders and such other portions of arrangement FIG. 9 as may require clocking. At each clock pulse, adder 912 adds together a frequency word from a frequency word register 914 together with the output of a latch 916 to produce a sum signal on a conductor 918 which sum signal is applied to an input of a register 920. Register 920 sequentially receives the sum signals and couples them to latch 916 to be latched at each clock cycle. As time progresses, the output of the adder increases in magnitude as the frequency word is summed again and again, and eventually register 920 overflows and produces a value near zero which is latched and fed back to the input of adder 912. This starts the accumulation again from a value near zero, resulting in a digital signal equivalent to a recurrent analog sawtooth signal, which is illustrated as 922. The clock frequency and the magnitude of the frequency word together establish how often register 920 overflows and therefore establish the frequency of the local oscillator signal. The digital "sawtooth" signal from latch 916 is applied to the input of an adder 924. A second input of adder 924 receives the phase correction signal $\theta$ from switch 326c and adds it to the then current value of sawtooth 922. The added value of $\theta$ offsets the magnitude of sawtooth 922 to produce an offset sawtooth illustrated as 926. Offset sawtooth 926 increases at the same rate as the nonoffset sawtooth 922, and when a value of $\theta$ is added, adder 924 overflows earlier than it would in the absence of an added value of $\theta$. In effect, the amplitude of sawtooth 922 is increased by the magnitude of $\theta$ to the value illustrated by sawtooth 926 at any point during its recurrent cycle prior to overflow. Summed sawtooth 926 generated by adder 924 is applied as an address input to a sine ROM 930 and to a cosine ROM 932 preprogrammed at each addressable memory location with a digital word representative of the analog value of a sinusoid having the same period as the digital sawtooth waveform. The output of sine ROM 930 on conductor 934 is a sequence of digital words representing the values taken by a sinusoid having the same recurrence rate as sawtooth 922, and the output of cosine ROM 932 on conductor 936 is an equivalent cosine, 90° phase-shifted relative to the signal on conductor 934. The sinusoid on conductor 934 and the cosinusoid on conductor 936 are applied to mixers 318 and 316 (FIG. 3) respectively. The digital phase-shifter of FIG. 9 is similar to that described in U.S. patent application Ser. No. 687,546 filed Dec. 28, 1984 in the name of E. J. Nossen, and entitled "Digital Modulation System".

Figure 10:
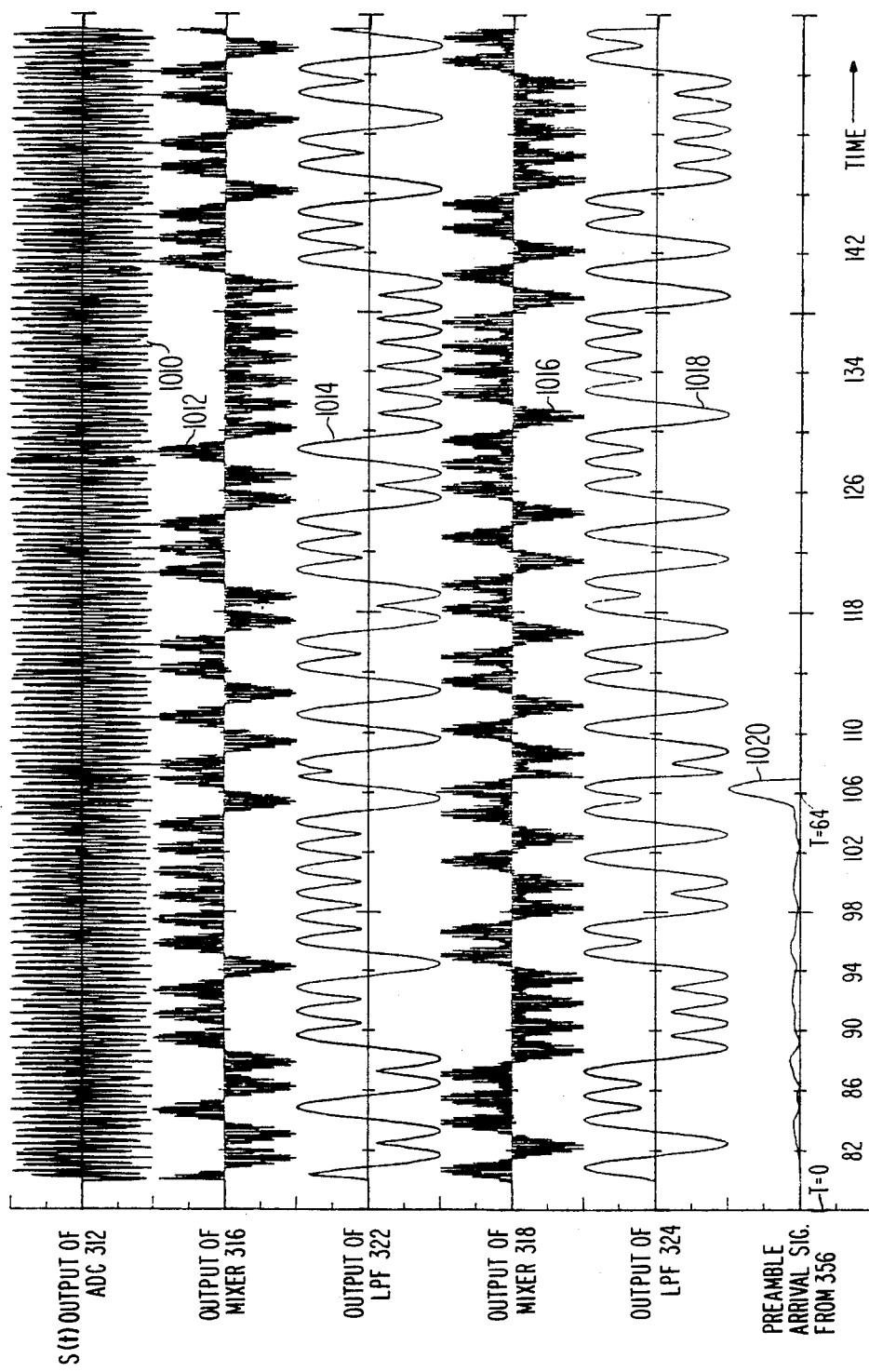

FIG. 10 illustrates amplitude-time plots of signals associated with a receiver according to the invention for the situation in which $\theta = 3.1$ radians (177.6°). Waveform 1010 represents the sampled modulated carrier at the output of ADC 312 (FIG. 6b). The output of mixer 316 is illustrated as 1012, and that of mixer 318 as 1016. Sample times are illustrated beginning at sample 78, arbitrarily taken as time $T=0$. Comparison of waveform 1012 in the interval $T=0$ to $T=64$ (the preamble interval) with waveform 214 (FIG. 2) shows that waveform 1012 corresponds with waveform 214, except for the presence of high-frequency sampling noise. Waveform 1014 in the interval T0–T64 corresponds substantially exactly with waveform 214. Similarly, waveform 1018 corresponds with Q waveform 216 (FIG. 2). Since the phase offset is very close to 180°, decoding of the preamble is readily accomplished, and the correlation peak of the preamble arrival signal 1020 is well defined. The data illustrated as being decoded after time T-64 is for illustrative purposes only.

Figure 11:
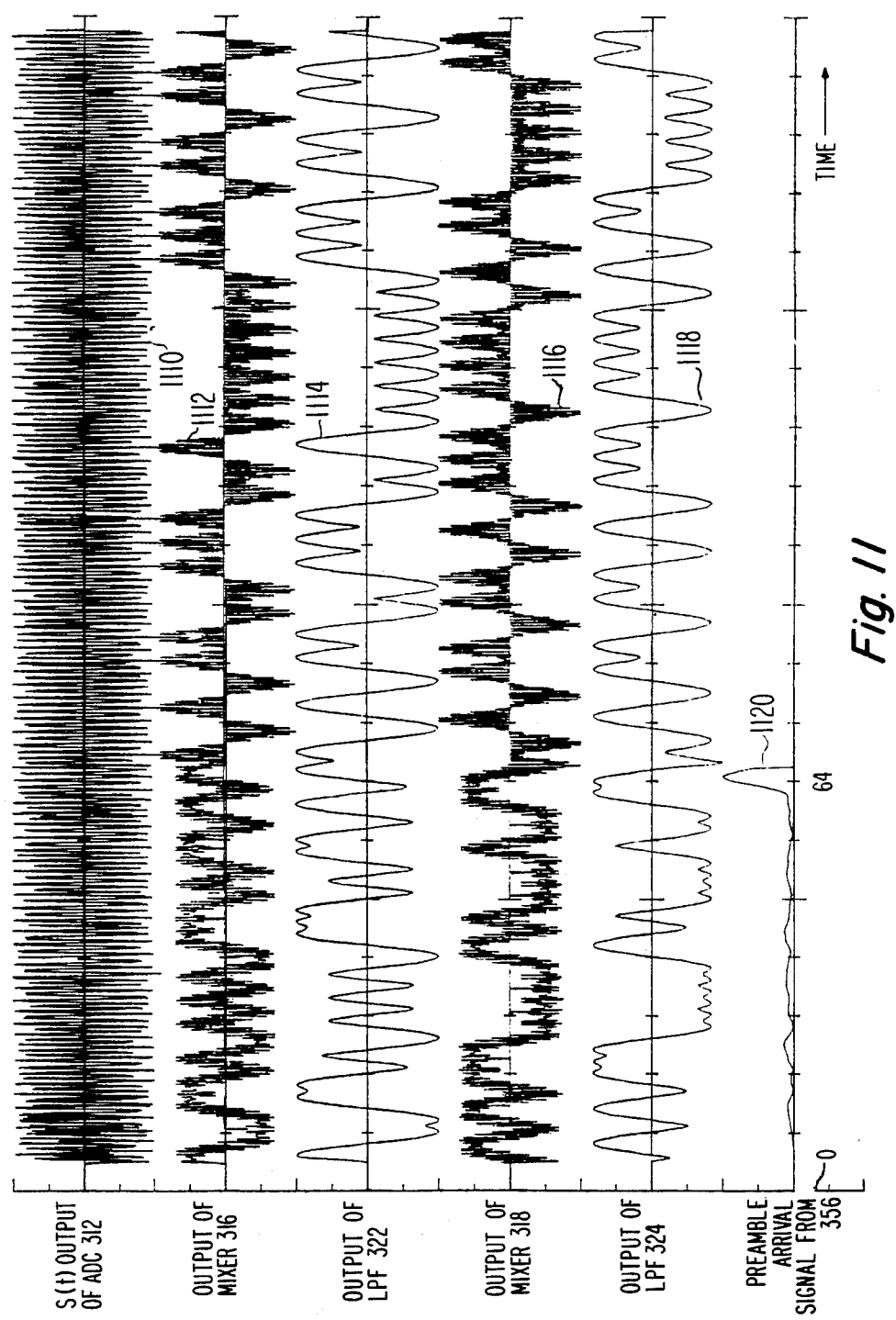

FIG. 11 illustrates waveforms corresponding to those of FIG. 10 for the case of a phase offset of 0.8 radians (about 46°). The very poor definition of the multiplied (1112, 1116) and filtered (1114, 1118) I and Q signals is evident in the interval T0–T64. Since the preamble is the same in the cases of both FIGS. 10 and 11, the demodulated preamble in the interval T0–T64 would be the same but for the error due the demodulator reference signal phase. The preamble is substantially unrecognizable to the eye. However, after time T64, phase acquisition occurs, and the demodulated data signal is seen to be virtually identical to that illustrated in FIG. 10.

FIG. 12 illustrates as 1210 and 1214 the outputs of symbol-matched filters 608' and 608'' (FIG. 7) during receipt of a preamble with $\theta = 3.1$ rad, as in FIG. 10. Also illustrated in FIG. 12 as 1216, 1218, 1220 and 1222 are $Q_1(t)$, $I_1(t)$, $I_2(t)$, and $Q_2(t)$, respectively, which are the output signals from the matched filters (FIG. 6b).

As described herein, the receiver according to the invention may be embodied as hardware or as combined hardware-firmware (dedicated logic circuits preprogrammed for a specific function). Since MSK signals are analog signals, a preferred embodiment of the receiver for 1200 bps data rate implements those portions of the receiver preceding buffer 314 (FIG. 6b) as hardware, and those portions following ADC 312 as preprogrammed firmware. The programming of such firmware is believed to be obvious to those skilled in the art in view of the detailed description of the invention associated with the functional block diagrams.

Other embodiments of the invention will be apparent to those skilled in the art. For example, equivalent analog and digital processing may be interchanged as desired. The preamble may include more or less than 32 bits and the number of samples per bit may be other than eight. The MSK carrier frequency and deviation, the IF frequency, and the sampling frequency may be selected depending upon system constraints. The bit rate may be selected in accordance with the required data rate. Any type of correlator, several of which are described in U.S. Pat. No. 4,240,111, may be used to generate a correlation peak upon the arrival of the predetermined preamble. The digital portions of the described arrangement may be arranged for parallel or serial signal processing, as may be convenient. More exact means for producing a moment-of-arrival signal may be used than a simple threshold, as for example averaging the leading and lagging times at which correlation signal 218 of FIG. 2 crosses threshold R(τ).

What is claimed is:

1. A demodulator for signal transmission including in-phase and quadrature components of information preceded by a known preamble, all MSK-modulated onto a carrier, comprising:

demodulating means for demodulating said signal transmissions under control of reference sine and cosine signals whereby noncoherent demodulation takes place when said reference sine and cosine signals are not in-phase and in phase quadrature, respectively, with said carrier, and coherent demodulation takes place when said reference sine and cosine signals are in-phase and in phase quadrature, respectively, with said carrier; for regenerating said in-phase and quadrature components of information and preamble;

preamble-matched filter means coupled to said demodulating means for receiving at least said in-phase and quadrature components of said preamble and for applying said in-phase and quadrature components of said preamble to four parallel-preamble-matched correlators responsive to said in-phase and quadrature components of said preamble, and also responsive to the quadrature and in-phase components of said preamble contaminating said in-phase and quadrature components, respectively, for producing at the moment at which said preamble completely fills said four correlators from each of said four correlators a correlation peak having a magnitude and a polarity which taken together uniquely determines the phase difference between said reference sine signal and said carrier; and control means coupled to said matched filter means and to said demodulating means for determining said phase difference to produce a difference-indicative signal and for applying said difference-indicative signal to said demodulating means for controlling the phase of said reference signals to reduce the phase difference between said reference sine signal and said carrier whereby substantially coherent demodulating takes place after receipt of said preamble.

2. A demodulator for sampled digital minimum-shaft keyed signals having a nominal carrier frequency, and comprising a plurality of sets of sidebands, said sampled digital minimum-shift keyed signals being arranged in a format including a preamble consisting of a predetermined arrangement of Mark and Space, each said Mark being represented by one of a first frequency and a second frequency, and each said Space being represented by the other of said first frequency and said second frequency, said first frequency being represented by the sum of said carrier frequency and an incremental frequency, and each said second frequency being represented by said carrier frequency minus said incremental frequency, said demodulator comprising:

a first mixer including a first input terminal and also including a second input terminal coupled to receive said digital minimum-shift keyed signals;

a second mixer including a first input terminal and also including a second input terminal coupled to receive said digital minimum-shift keyed signals;

a first controllable source of reference signals representative of a sinusoid having a frequency near said nominal carrier frequency, said first controllable source of reference signals being coupled to said first terminal of said first mixer for generating from said first mixer a first component of a heterodyned complex signal, said first component of said heterodyned complex signal having a second plurality of sets of spectral components corresponding to said plurality of sets of sidebands of said minimum-shift keyed signals, one set of said second plurality of sets of spectral components of said first component of said heterodyned complex signal being a first baseband component of said complex signal;

a second controllable source of reference signals representative of a sinusoid having a frequency near said nominal carrier frequency, said second controllable source of reference signals being coupled to said first terminal of said second mixer for generating from said second mixer a second component of said heterodyned complex signal, said second component of said heterodyned complex signal having a third plurality of sets of spectral components corresponding to said plurality of sets of sidebands of said minimum-shift keyed signals, one set of said third plurality of sets of spectral components of said second component of said heterodyned complex signal being a second baseband component of said complex signal;

first filter means coupled to said first and second mixers for passing said first and second baseband components of said complex signal and for removing other sidebands to produce first and second filtered baseband components of said complex signal;

matched filter means coupled to said first filter means for receiving said first and second filtered baseband components of said complex signal therefrom, for generating time-delayed samples of said first and second filtered baseband components of said complex signal, for weighting said time-delayed samples to produce weighted time-delayed samples, and for adding said weighted time-delayed samples together in such a fashion that first, second, third and fourth impulse signals may be generated at the instant at which a complete preamble is received by said matched filter means, the magnitudes of said first and second impulse signals generated at said instant being inversely related so that said first impulse signal has a maximum magnitude when said second impulse signal has a minimum magnitude, and said second impulse signal has a maximum magnitude when said first impulse signal has a minimum magnitude, the magnitudes of said third and fourth impulses signals generated at said instant being inversely related so that said third impulse signal has a maximum magnitude when said fourth impulse signal has a minimum magnitude, and said fourth impulse signal has a maximum magnitude when said third impulse signal has a minimum magnitude;

summing means coupled to said matched filter means for receiving said first, second, third and fourth impulse signals for summing together said first and third impulse signal to produce a first summed impulse signal, and for taking the difference between said second and fourth impulse signals to produce a second summed impulse signal, the magnitude of said first summed impulse signal being a maximum and that of said second summed impulse signal being a minimum when said second reference signal is in-phase with said carrier and said first reference signal is in phase-quadrature with said carrier, and the magnitude of said second summed impulse signal being a maximum and that of said first summed impulse signal being a minimum when said second reference signal is in phase-quadrature with said carrier and said first reference signal is in-phase with said carrier;

first signal processing means coupled to said summing means for squaring each of said first and second summed impulse signals to produce first and second squared impulse signals, and for adding together said squared impulse signals to generate a time-of-arrival signal indicative of said instant at which said preamble is received;

aquisition-mode arctangent signal generating means coupled to said summing means for generating an arctangent signal representing the angle whose tangent is the ratio of said second summed impulse signal and said first summed impulse signal, and also coupled to said first signal processing means for producing said arctangent signal in response to said time-of-arrival signal, said arctangent signal being an estimate of the phase difference between said carrier and said second reference signal; and control means coupled to said arctangent signal generator and to said first and second controllable sources of reference signals for changing the phase of said first and second reference signals in response to said arctangent signal in a polarity which reduces the phase difference between said second reference signal and said carrier.

3. A demodulator according to claim 2 wherein said matched filter means comprises:

first tapped delay means coupled to said first filter means for receiving said first filtered baseband component therefrom for producing a plurality of delayed filtered first component signals;

first weighting means coupled to said first tapped delay means for weighting said delayed filtered first component signals according to a first weighting function for producing first weighted signals;

second weighting means coupled to said first tapped delay means for weighting said delayed filtered first component signals according to a second weighting function for producing second weighted signals;

first tap adder means coupled to said first weighting means for adding together said first weighted signals for producing said first impulse signal;

second tap adder means coupled to said second weighting means for adding together said second weighted signals for producing said second impulse signal;

second tapped delay means identical with said first tapped delay means, said second tapped delay means being coupled to said second filter means for receiving said second filtered baseband component therefrom for producing a plurality of delayed filtered second component signals;

third and fourth weighting means identical with said first and second weighting means, respectively, said third and fourth weighting means being coupled to said second tapped delay means for producing third and fourth weighted signals, respectively; and third and fourth tap adder means coupled to said third and fourth weighting means, respectively, for adding together said third and fourth weighted signals, respectively, for producing said third and fourth impulse signals.

4. A demodulator according to claim 2 wherein said matched filter means comprises:

a first tapped delay means having a time delay equal to the duration of a Mark or Space symbol, said first tapped delay means being coupled to said first filter means for receiving said first filtered baseband component therefrom for producing a plurality of first delayed filtered first component signals;

first weighting means coupled to said first tapped delay means for weighting said plurality of first delayed filtered first component signals with a function which corresponds with the amplitude-time characteristic of said minimum shift keyed signal during said symbol for generating a plurality of first weighted delayed signals;

second summing means coupled to said first weighting means for adding together said plurality of first weighted delayed signals to produce amplitude-weighted first component signals;

second tapped delay means having a delay greater than said duration of a Mark or Space symbol, said second tapped delay means being coupled to said second summing means for receiving said amplitude-weighted first component signal for producing a second plurality of amplitude-weighted delayed first component signals mutually delayed by said time delay of said first tapped delay means; and third summing means coupled to said second tapped delay means for summing together said second plurality of amplitude-weighted delayed first component signals to produce said first impulse signal.

5. A demodulator according to claim 4 wherein said matched filter means further comprises:

a third tapped delay means having a time delay equal to said duration of a Mark or Space symbol, said third tapped delay means being coupled to said first filter means for receiving said second filtered baseband component therefrom for producing a plurality of first delayed filtered second component signals;

second weighting means coupled to said third tapped delay means for weighting said plurality of first delayed filtered second component signals with a function which corresponds with the amplitude-time characteristic of said minimum shift keyed signal during said symbol for generating a plurality of second weighted delayed signals;

fourth summing means coupled to said second weighting means for adding together said plurality of second weighted delayed signals to produce amplitude-weighted second component signals;

fourth tapped delay means having a delay greater than said duration of a Mark or Space symbol, said fourth tapped delay means being coupled to said fourth summing means for receiving said amplitude-weighted second component signals for producing a third plurality of amplitude-weighted delayed second component signals mutually delayed by said time delay of said third tapped delay means; and fifth summing means coupled to said fourth tapped delay means for summing together said third plurality of amplitude-weighted delayed second component signals to produce said second impulse signal.

6. A demodulator according to claim 5 further comprising:

first sampling means coupled to said second summing means for receiving said amplitude-weighted first component signals and for sampling said amplitude-weighted first component signals at times near the peak of a symbol and at times near a zero of a symbol for generating sampled first component signals;

second sampling means coupled to said fourth summing means for receiving said amplitude-weighted second component signals and for sampling said amplitude-weighted second component signals at times near the peak of a symbol and at times near a zero of the signal for generating sampled second component signals;

first alternating means coupled to said first sampling means for receiving said sampled first component signals therefrom for applying said sampled first component signal sampled at times near said peak of a symbol to a first terminal to form a first alternated signal including a sign bit, and for applying said sampled first component signal sampled at times near a zero of a symbol to a second terminal to form a second alternated signal;

second alternating means coupled to said second sampling means for receiving said sampled second component signals therefrom for applying said sampled second component signal sampled at times near said peak of a symbol to a first terminal for forming a third alternated signal including a sign bit, and for applying said sampled second component signal sampled at times near a zero of a symbol to a fourth terminal to form a fourth alternated signal;

first sign bit selecting means coupled to said first terminal of said first alternating means for selecting said sign bit from said first alternated signal to form a first alternated sign bit signal;

second sign bit selecting means coupled to said first terminal of said second alternating means for selecting said sign bit from said third alternated signal to form a second alternated sign bit signal;

first absolute-value multiplying means coupled to said first terminal of said first alternating means and to said first sign bit selecting means for multiplying said first alternated signal by said first alternated sign bit signal for forming an absolute-value first signal component;

second absolute-value multiplying means coupled to said first terminal of said second alternating means and to said second sign bit selecting means for multiplying said third alternated signal by said second alternated sign bit signal for forming an absolute-value second signal component;

first residue signal multiplying means coupled to said second terminal of said first alternating means and to said sign bit selecting means for multiplying said second alternated signal by said second alternated sign bit signal for forming a multiplied first residue signal;

second residue signal multiplying means coupled to said second terminal of said second alternating means and to said first sign bit selecting means for multiplying said fourth alternated signal by said first alternated sign bit signal for forming a multiplied second residue signal;

first accumulation means coupled to said first absolute-value multiplying means for receiving said absolute-value first signal component therefrom for accumulating said absolute-value first signal components for a predetermined interval to form a first inphase signal;

second accumulation means coupled to said second absolute-value multiplying means for receiving said absolute-value second signal component therefrom for accumulating said absolute-value second signal component for said predetermined interval to form a first quadrature signal;

third accumulation means coupled to said first residue signal multiplying means for receiving said multiplied first residue signal therefrom for accumulating said multiplied first residue signal for said predetermined interval to form a second inphase signal;

fourth accumulation means coupled to said second residue signal multiplying means for receiving said multiplied second residue signal therefrom for accumulating said multiplied second residue signal for said predetermined interval to form a second quadrature signal;

collecting means coupled to said first, second, third and fourth accumulating means for adding together said first and second inphase signals for forming a summed inphase signal and for taking the difference between said first and second quadrature signals for forming a summed quadrature signal; and a message-mode arctangent signal generator coupled to said collecting means and responsive to said summed inphase and summed quadrature signals for forming a theta signal representative of the phase difference between said nominal carrier and said reference signals.

7. A demodulator according to claim 6 wherein said control means comprises switch means coupled to said acquisition-mode arctangent signal generator, to said message-mode arctangent signal generator, to said first and second controllable sources of reference signals and to said first signal processing means for controlling said first and second controllable sources of reference signals with said arctangent signal before receipt of said time-of-arrival signal and for controlling said first and second controllable sources of reference signals with said theta signal after receipt of said time-of-arrival signal.

8. A method for demodulating sampled digital minimum-shift keyed signals having a nominal carrier frequency, and comprising a plurality of sets of sidebands, said sampled digital minimum-shift keyed signals being arranged in a format including a preamble consisting of a predetermined arrangement of Mark and Space, each said Mark being represented by one of a first frequency and a second frequency, and each said Space being represented by the other of said first frequency and said second frequency, said first frequency being represented by the sum of said carrier frequency and an incremental frequency, and each said a second frequency being represented by said carrier frequency minus said incremental frequency, said method comprising the steps of:

applying said digital minimum-shift keyed signals to a first input terminal of a first mixer and to a first input terminal of a second mixer;

controllably generating reference signals representative of a sinusoid having a frequency near said nominal carrier frequency and coupling them to a second terminal of said first mixer for generating from said first mixer a first component of a heterodyned complex signal, said first component of said heterodyned complex signal having a second plurality of sets of spectral components corresponding to said plurality of sets of sidebands of said minimum-shift keyed signals, one set of said second plurality of sets of spectral components of said first component of said heterodyned complex signal being a first baseband component of said complex signal;

controllably generating reference signals representative of a sinusoid having a frequency near said nominal carrier frequency and coupling them to a second terminal of said second mixer for generating from said second mixer a second component of said heterodyned complex signal, said second component of said heterodyned complex signal having a third plurality of sets of spectral components corresponding to said plurality of sets of sidebands of said minimum-shift keyed signals, one set of said third plurality of sets of spectral components of said second component of said heterodyned complex signal being a second baseband component of said complex signal;

filtering said first and second baseband components of said complex signal for removing other sidebands to produce first and second filtered baseband components of said complex signal;

matched-filtering said first and second filtered baseband components of said complex signal by generating time-delayed samples of said first and second filtered baseband components of said complex signal, weighting said time-delayed samples to produce weighted time-delayed samples, and adding said weighted time-delayed samples together in such a fashion that first, second, third and fourth impulse signals may be generated at the instant at which a complete preamble is match-filtered, the magnitudes of said first and second impulse signals generated at said instant being inversely related so that said first impulse signal has a maximum magnitude when said second impulse signal has a minimum magnitude, and said second impulse signal has a maximum magnitude when said first impulse signal has a minimum magnitude, the magnitudes of said third and fourth impulse signals generated at said instant being inversely related so that said third impulse signal has a maximum magnitude when said fourth impulse signal has a minimum magnitude, and said fourth impulse signal has a maximum magnitude when said third impulse signal has a minimum magnitude;

summing together said first and third impulse signal to produce a first summed impulse signal, taking the difference between said second and fourth impulse signals to produce a second summed impulse signal, the magnitude of said first summed impulse signal being a maximum and that of said second summed impulse signal being a minimum when said second reference signal is in-phase with said carrier and said first reference signal is in phase-quadrature with said carrier, and the magnitude of said second summed impulse signal being a maximum and that of said first summed impulse signal being a minimum when said second reference signal is in phase-quadrature with said carrier and said first reference signal is in-phase with said carrier;

squaring each of said first and second summed impulse signals to produce first and second squared impulse signals, and adding together said squared impulse signals to generate a time-of-arrival signal indicative of said instant at which said preamble is match-filtered;

generating an arctangent signal representing the angle whose tangent is the ratio of said second summed impulse signal and said first summed impulse signal, and producing said arctangent signal in response to said time-of-arrival signal, said arctangent signal being an estimate of the phase difference between said carrier and said second reference signal; and changing the phase of said first and second reference signals in response to said arctangent signal in a polarity which reduces the phase difference between said second reference signal and said carrier.

* * * * *